United States Patent
Tran et al.

(10) Patent No.: US 10,767,724 B2
(45) Date of Patent: *Sep. 8, 2020

(54) ISOLATOR FOR USE WITH ENGINE THAT IS ASSISTED OR STARTED BY AN MGU OR A MOTOR THROUGH AN ENDLESS DRIVE MEMBER

(71) Applicant: Litens Automotive Partnership, Woodbridge (CA)

(72) Inventors: Hao Tran, North York (CA); Andrew M. Boyes, Aurora (CA); Boris Replete, Toronto (CA)

(73) Assignee: Litens Automotive Partnership, Woodbridge (CA)

( * ) Notice: Subject to any disclaimer, the term of this patent is extended or adjusted under 35 U.S.C. 154(b) by 1183 days.

This patent is subject to a terminal disclaimer.

(21) Appl. No.: 14/964,556

(22) Filed: Dec. 9, 2015

(65) Prior Publication Data
US 2016/0091048 A1    Mar. 31, 2016

Related U.S. Application Data

(63) Continuation-in-part of application No. PCT/CA2014/000659, filed on Aug. 27, 2014.
(Continued)

(51) Int. Cl.
*F16F 15/123* (2006.01)
*F16H 55/36* (2006.01)
(Continued)

(52) U.S. Cl.
CPC ........ *F16F 15/12346* (2013.01); *B60K 25/02* (2013.01); *F02B 67/06* (2013.01);
(Continued)

(58) Field of Classification Search
CPC .................................. F16D 3/12; F16H 55/36
See application file for complete search history.

(56) References Cited

U.S. PATENT DOCUMENTS 3,890,803 A * 6/1975 Neal ........................ F16D 59/00
188/134
5,393,266 A    2/1995 Braun et al.
(Continued)

FOREIGN PATENT DOCUMENTS

CN     101111692 A    1/2008
CN     103210226 A    7/2013
(Continued)

OTHER PUBLICATIONS

Riementrieb and Komponenten, KRAFTHAND Profi Werkstatt-PRAXIS, p. 16, 2011.
(Continued)

*Primary Examiner* — Michael R Mansen
*Assistant Examiner* — Mark K Buse
(74) *Attorney, Agent, or Firm* — Millman IP Inc.

(57) ABSTRACT

An isolator for isolating a device driven by an engine via an endless drive member is described. The isolator comprises a shaft adapter that is connectable with a shaft of the device, defining a shaft adapter axis, a rotary drive member that is rotatable relative to the shaft adapter and has an endless drive member engagement surface that is engageable with the endless drive member, and an isolation spring arrangement positioned to transfer torque between the shaft adapter and the rotary drive member. The isolation spring arrangement has at least one isolation spring that is axially offset from the endless drive member engagement surface. The at least one isolation spring has an outer edge that is radially outside the endless drive member engagement surface.

11 Claims, 19 Drawing Sheets

Related U.S. Application Data

(60) Provisional application No. 62/089,403, filed on Dec. 9, 2014.

(51) Int. Cl.

| | | |
|---|---|---|
| *F02B 67/06* | (2006.01) | |
| *F16H 55/49* | (2006.01) | |
| *B60K 25/02* | (2006.01) | |
| *F16D 3/10* | (2006.01) | |
| *F16D 3/12* | (2006.01) | |
| *F16D 3/14* | (2006.01) | |
| *F16D 3/66* | (2006.01) | |

(52) U.S. Cl.
CPC ....... *F16F 15/12373* (2013.01); *F16H 55/36* (2013.01); *F16H 55/49* (2013.01); *F16D 3/10* (2013.01); *F16D 3/12* (2013.01); *F16D 3/14* (2013.01); *F16D 3/66* (2013.01); *F16H 2055/366* (2013.01)

(56) References Cited

U.S. PATENT DOCUMENTS

| | | |
|---|---|---|
| 5,517,957 A | 5/1996 | Wagner et al. |
| 7,070,033 B2 | 7/2006 | Jansen et al. |
| 7,275,630 B2 | 10/2007 | Jansen et al. |
| 7,708,661 B2 | 5/2010 | Pflug et al. |
| 8,641,563 B2 | 2/2014 | Mende et al. |
| 9,291,253 B1 | 3/2016 | Alexander et al. |
| 9,869,365 B2* | 1/2018 | Tran .......... F16D 3/10 |
| 10,024,384 B2* | 7/2018 | Mitsubori .......... F16D 3/12 |
| 2006/0240926 A1 | 10/2006 | Wiesneth et al. |
| 2008/0139351 A1 | 6/2008 | Pflug et al. |
| 2008/0194339 A1* | 8/2008 | Antchak .......... F16D 7/022 464/40 |
| 2008/0312014 A1 | 12/2008 | Stief et al. |
| 2009/0121401 A1* | 5/2009 | Lehmann .......... F16D 3/66 267/215 |
| 2009/0211871 A1 | 8/2009 | Hartmann et al. |
| 2011/0021276 A1* | 1/2011 | Jameson .......... F16F 15/123 464/67.1 |
| 2011/0263365 A1 | 10/2011 | Mende et al. |
| 2013/0217524 A1* | 8/2013 | Antchak .......... F02B 67/06 474/94 |
| 2013/0237351 A1* | 9/2013 | Marion .......... B60K 25/02 474/70 |
| 2015/0260233 A1* | 9/2015 | Boyes .......... F16H 55/36 474/94 |
| 2016/0123453 A1* | 5/2016 | Starodoubov .......... B60K 25/02 474/94 |
| 2016/0201757 A1* | 7/2016 | Tran .......... F16D 3/10 474/94 |
| 2016/0333987 A1* | 11/2016 | Tran .......... B60K 25/02 |
| 2017/0363183 A1* | 12/2017 | Replete .......... F02B 67/06 |
| 2018/0087599 A1* | 3/2018 | Replete .......... B60K 25/02 |

FOREIGN PATENT DOCUMENTS

| | | |
|---|---|---|
| CN | 103221704 A | 7/2013 |
| DE | 9417045 U | 2/1995 |
| DE | 19511188 C2 | 11/1998 |
| DE | 102005062318 A1 | 7/2007 |
| DE | 102006019877 A1 | 10/2007 |
| DE | 102006039362 A1 | 3/2008 |
| DE | 102006039363 A1 | 3/2008 |
| DE | 102007034538 A1 | 1/2009 |
| DE | 102009006354 A1 | 8/2009 |
| DE | 102009039989 A1 | 4/2010 |
| DE | 102009014203 A1 | 9/2010 |
| DE | 102010011831 A1 | 9/2011 |
| DE | 102011104135 A1 | 12/2011 |
| DE | 102010047929 A1 | 4/2012 |
| DE | 102010047930 A1 | 4/2012 |
| DE | 102011086093 A1 | 9/2012 |
| DE | 102011081931 A1 | 3/2013 |
| DE | 102011086280 A1 | 5/2013 |
| DE | 102012216116 A1 | 6/2013 |
| EP | 2148109 B1 | 1/2012 |
| WO | 2007074016 A1 | 7/2007 |
| WO | 2008022897 A1 | 2/2008 |
| WO | 2008067915 A1 | 6/2008 |
| WO | 2008071306 A1 | 6/2008 |
| WO | 2009013071 A1 | 1/2009 |
| WO | 2012061936 A1 | 4/2010 |
| WO | 2011127898 A1 | 10/2011 |
| WO | 2012000470 A1 | 1/2012 |
| WO | 2012061930 A1 | 5/2012 |
| WO | 2012075984 A1 | 6/2012 |

OTHER PUBLICATIONS

Office Action for CN201480046945.5 dated Nov. 29, 2017.
Office Action for CN201480046945.5 dated Nov. 29, 2017—English translation.
PCT/CA2014/000659, International Search Report, dated Nov. 12, 2014.
Extended European Search Report dated Apr. 23, 2020 for 19218537.9.

* cited by examiner

ISOLATOR FOR USE WITH ENGINE THAT IS ASSISTED OR STARTED BY AN MGU OR A MOTOR THROUGH AN ENDLESS DRIVE MEMBER

CROSS-REFERENCE TO RELATED APPLICATIONS

This application claims priority to U.S. Provisional Patent Application No. 62/089,403 filed on Dec. 9, 2014 and to Patent Co-operation Treaty Application No. PCT/CA2014/000659 filed on Aug. 24, 2014, all the contents of which are incorporated herein in their entirety.

FIELD

This disclosure relates to isolators and in particular to isolators that are used on an engine crankshaft or on a motor-generator unit (MGU) shaft in vehicles in which the engine can be started or boosted by the MGU through a belt (e.g. an engine equipped with a belt-alternator start (BAS) drive system).

BACKGROUND

Isolators are known devices that are installed on engine crankshafts and on accessory drive shafts for reducing the transmission of torsional vibrations from the crankshaft to a belt driven by the crankshaft and/or from the belt to the accessory drive shaft. While a traditional isolator is useful in many vehicular applications, some isolators do not perform ideally in applications wherein the belt is sometimes used to transmit torque to the crankshaft, for example as part of a Belt-Assisted Start (BAS) drive system wherein an electric motor is used to drive the belt in order to drive the crankshaft for the purpose of starting the engine.

It would be advantageous to provide an isolator that is configured for use in vehicles with BAS drive systems or the like.

SUMMARY

In an embodiment, there is provided an isolator for isolating a device driven by an engine via an endless drive member. The isolator includes, but is not necessarily limited to, a shaft adapter that is connectable with a shaft of the device, a rotary drive member and an isolation spring arrangement. The shaft adapter defines a shaft adapter axis. The rotary drive member is rotatable relative to the shaft adapter and had an endless drive member engagement surface that is engageable with the endless drive member. The isolation spring arrangement is positioned to transfer torque between the shaft adapter and the rotary drive member. The isolation spring arrangement has at least one isolation spring that is axially offset from the endless drive member engagement surface. The at least one isolation spring has an outer edge that is radially outside the endless drive member engagement surface.

In a related embodiment, the isolator further comprises a damping structure that includes a first damping surface that is rotationally fixed relative to one of the shaft adapter and the rotary drive member, a second damping surface that is rotationally fixed relative to the other of the shaft adapter and the rotary drive member, and a damping structure biasing member that urges the first and second damping surfaces into engagement with one another to generate a frictional torque to resist relative rotation between the shaft adapter and the rotary drive member about the shaft adapter axis.

In another related embodiment, the first damping surface is provided on a damping member that is at least partially annular about the shaft adapter axis, the damping member being biased towards frictional engagement with the second damping surface by the damping structure biasing member.

BRIEF DESCRIPTION OF THE DRAWINGS

The foregoing and other aspects will now be described by way of example only with reference to the attached drawings, in which.

DETAILED DESCRIPTION OF EXAMPLE EMBODIMENTS

Figure 1:
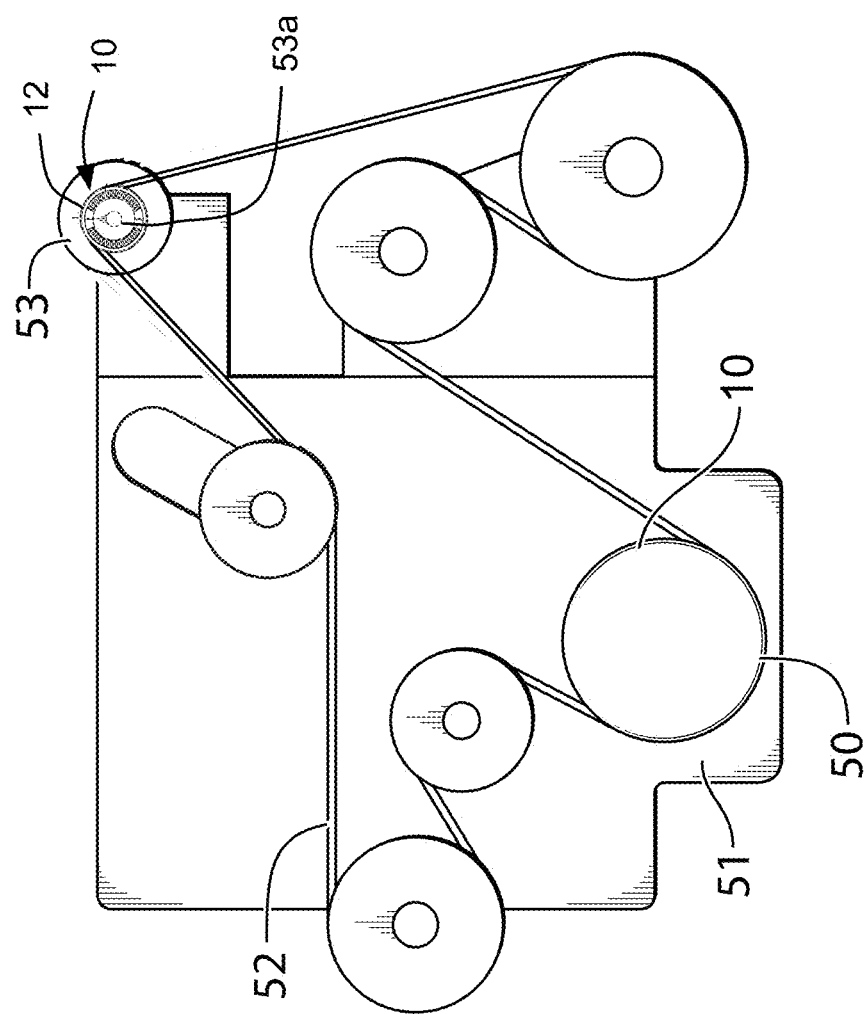
FIG. 1 is a side view of an engine in a vehicle containing an isolator on a shaft of an MGU (motor-generator unit), in accordance with a first non-limiting embodiment.

Reference is made to FIG. 1, which shows an isolator 10 for transferring power between an endless drive member 52, such as an accessory drive belt, that is driven by a crankshaft pulley 50 mounted on a crankshaft 50a of an engine 51, and a shaft 53a of a device, shown as an MGU (motor-generator unit) 53, in accordance with an embodiment of the present invention. The isolator 10 isolates the MGU 53 from torsional vibrations in the endless drive member 52 that commonly occur in internal combustion engines. The endless drive member 52 may be referred to as a belt for convenience, however, any suitable endless drive member may be used.

The isolator 10 is useful in any engine, but is particularly useful in an engine that incorporates a BAS (belt-alternator start) system, in which the engine 51 is initially started normally (e.g. using a starter motor) but is shut down for brief periods (e.g. while the vehicle is at a stoplight) and then restarted by driving the crankshaft 50a via the belt 52. The belt 52 would be driven by the MGU 53. Alternatively, the MGU 53 may be replaced by an alternator and a separate motor may be used to drive the belt 52 during BAS events. BAS technology is becoming increasingly common in an effort to increase fuel economy of vehicles and reduce emissions.

Figure 2:
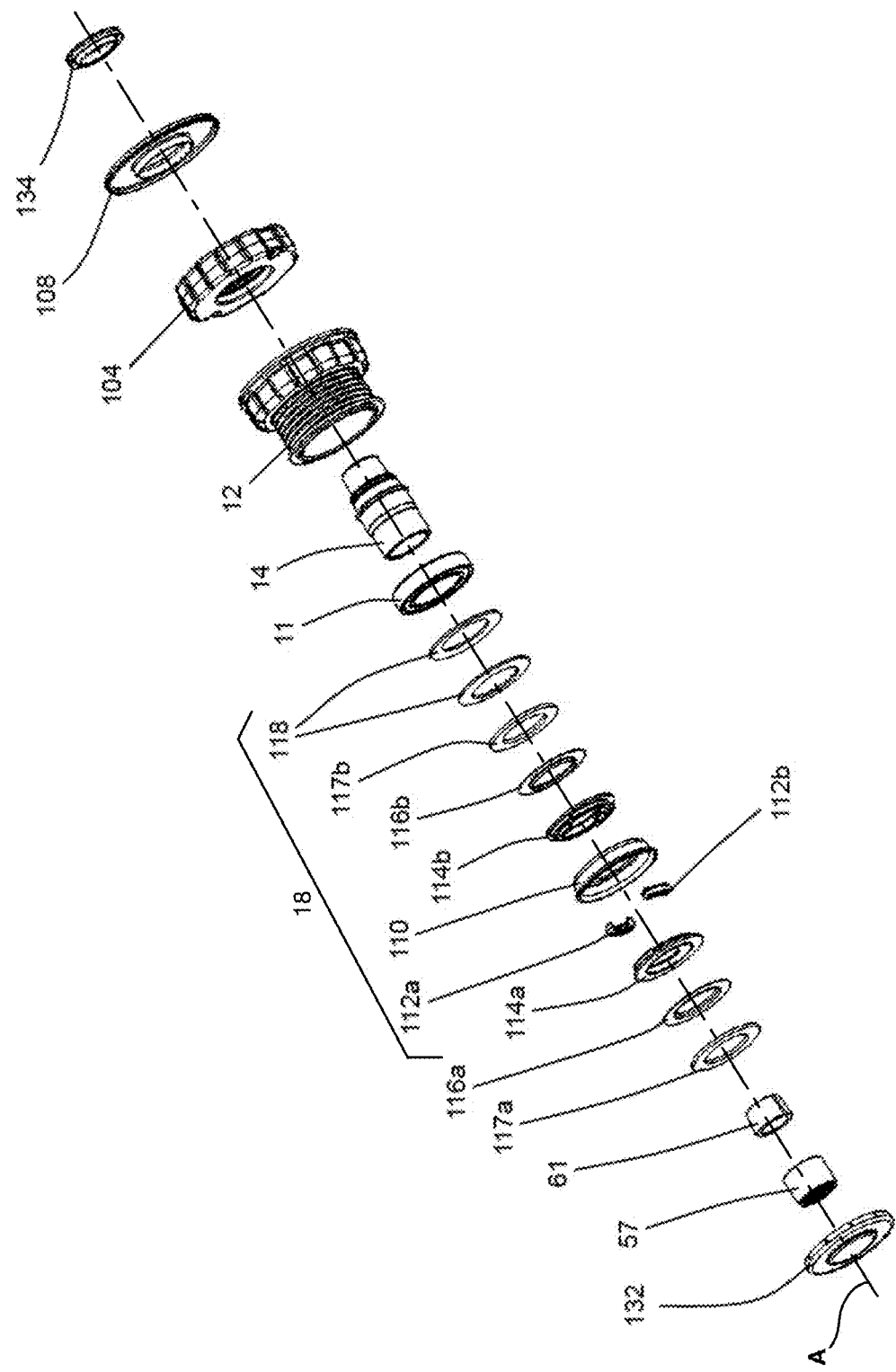
FIG. 2 is an exploded perspective view of the isolator shown in FIG. 1.

As seen in FIG. 2, the isolator 10 includes a rotary drive member 12 (which may for convenience be referred to as a pulley 12, but which may be any other suitable type of rotary drive member), a shaft adapter 14, at least one spring arrangement 16 (FIG. 3), and a position-based damping structure 18 (FIG. 2). As discussed further below, the shaft adapter 14 is connectable with the shaft 53a of the MGU and defines a shaft adapter axis A. Each spring arrangement 16 (FIG. 3) may include a single spring or multiple springs. In the embodiment shown in FIG. 3 it includes a first spring 17a and a second spring 17b nested within the first spring 17a. In some embodiments, the first spring 17a may have a first spring rate and the second spring 17b may have a second spring rate that is different from the first spring rate. For example, the first spring 17a may have a relatively lower spring rate (i.e., it may be softer) than the spring rate of the second spring 17b. In the embodiment shown there are two spring arrangements shown individually at 16a and 16b, however there could be more or fewer spring arrangements 16.

The spring arrangement 16 elastically deforms to isolate the endless drive member 52 and the MGU shaft 53a from vibrations or other sudden changes in torque in one another. Hence, the spring arrangement 16 is also referred to herein as an isolation spring arrangement 16. The isolation spring arrangement 16 is positioned to transfer torque between the shaft adapter 14 and the rotary drive member 12. The springs 17a and 17b in the examples shown are arcuate, helical coil compression springs. However, any other suitable type of springs could be used, such as, for example, arcuate closed cell foam springs.

The second springs 17b are shown as being shorter than the first springs 17a although it is optionally possible for the first and second springs 17a and 17b to have the same length. Each first spring 17a has a first end 40 and a second end 42.

Figure 4:
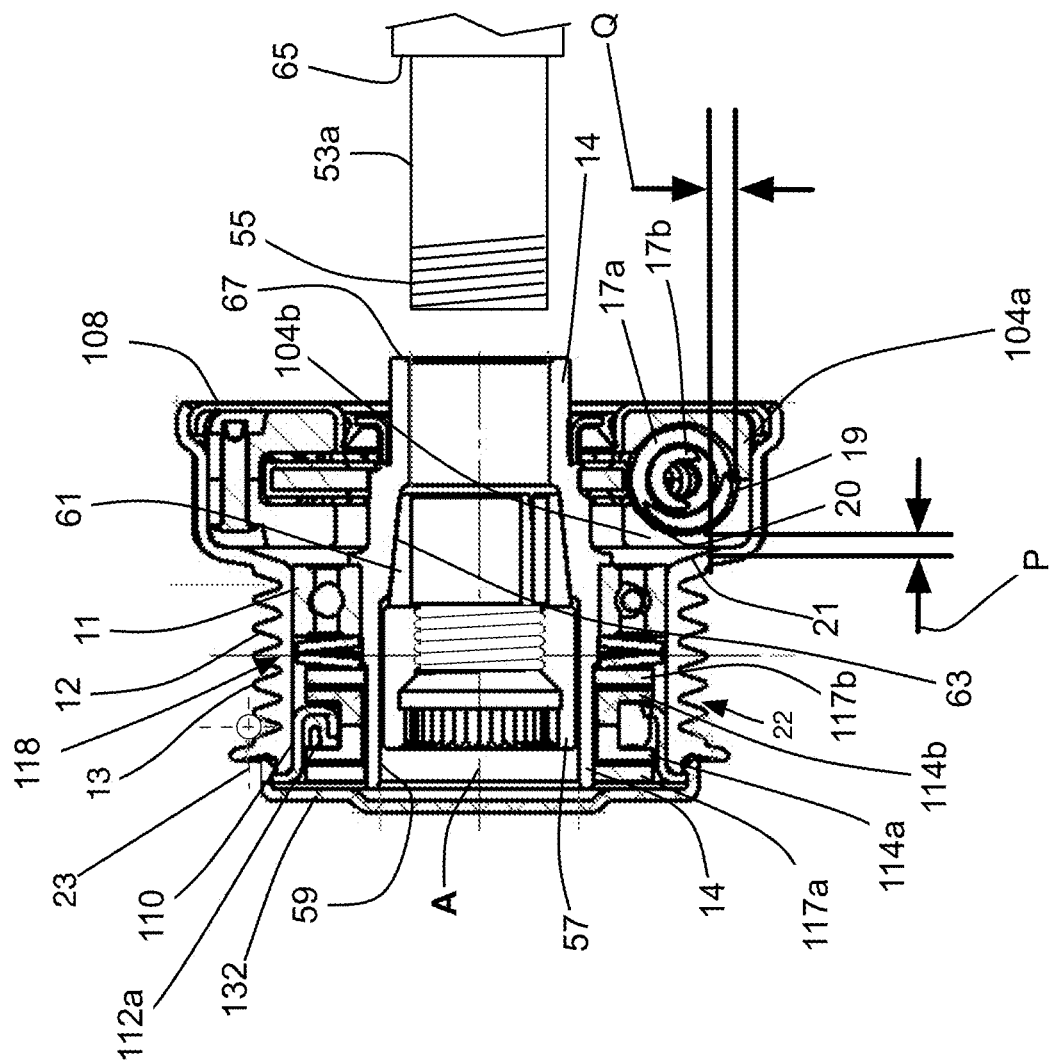
FIG. 4 is a sectional side view of the isolator shown in FIG. 1.

Referring to FIG. 4, the shaft adapter 14 is fixedly mountable in any suitable way to the MGU shaft 53a for rotation about the shaft adapter axis A, also referred to herein as axis A. For example, the MGU shaft 53a may include a shaft end 55 that is threaded and that mounts to a nut 57 inside a bore 59 of the shaft adapter 54. A conical split bushing 61 is urged against an inner-conical surface 63 of the shaft adapter 14. A shoulder 65 on the MGU shaft 53a abuts an end 67 of the shaft adapter 14. Threading the nut 57 on the shaft end 55 drives the split bushing 61 on the inner-conical surface 63 to urge gripping of the split bushing 61 on the shaft 53a. Alternatively any other mounting structure may be used.

Figure 3:
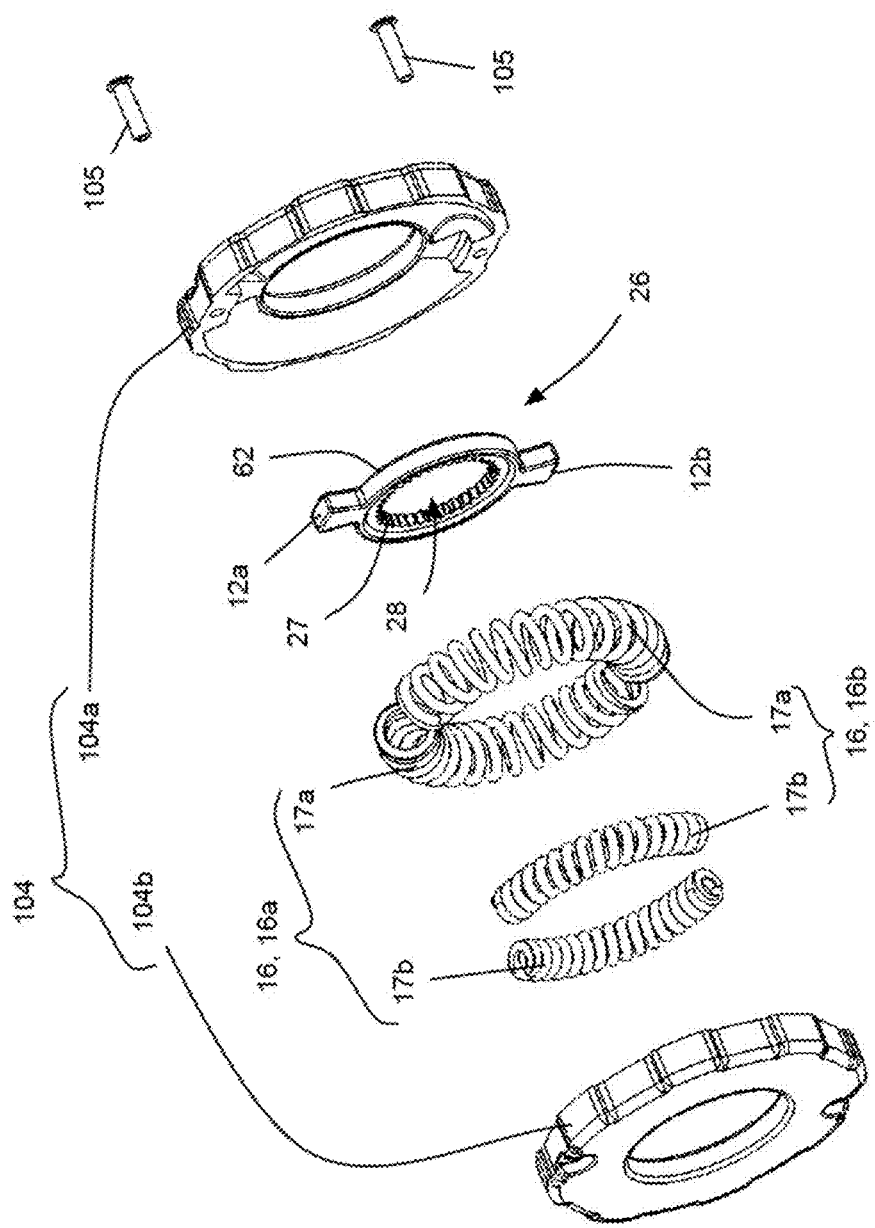
FIG. 3 is an exploded perspective view of a portion of the isolator shown in FIG. 1.
Figure 5:
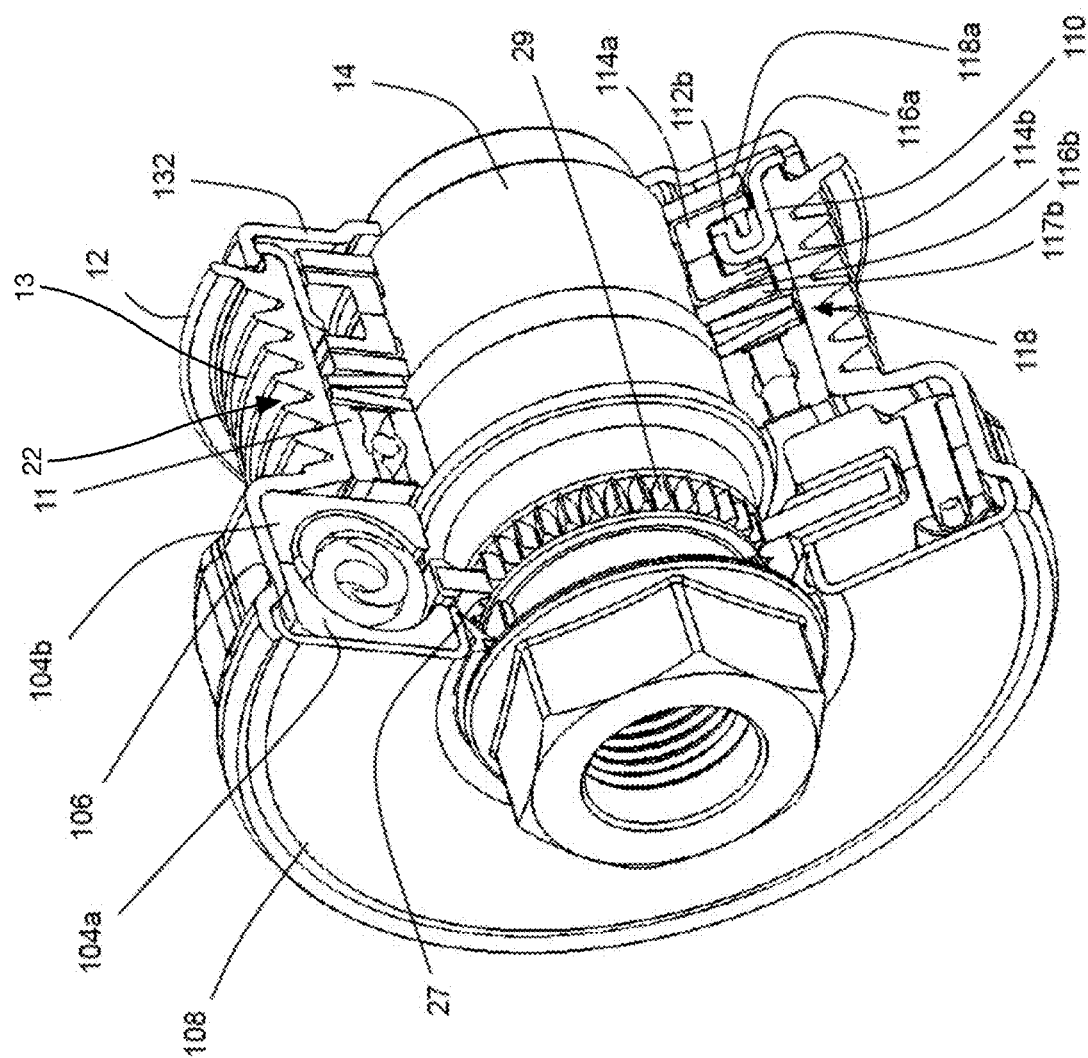
FIG. 5 is a perspective cutaway view of the isolator shown in FIG. 1.
Figure 6:
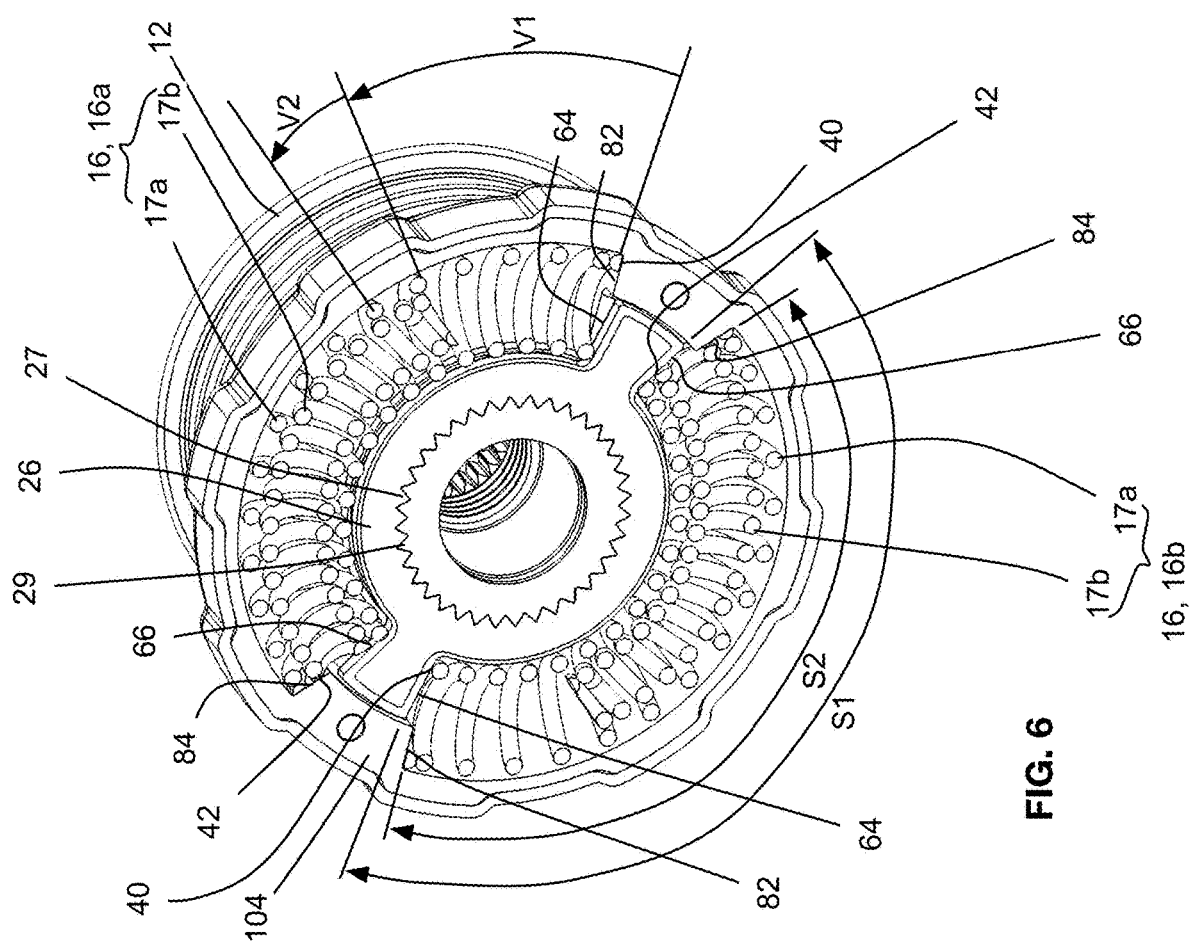
FIG. 6 is a perspective cutaway view of the isolator shown in FIG. 1, shown cut through a different plane than that shown in FIG. 5.

Referring to FIGS. 3, 5 and 6, a driver 26 is fixedly mounted to the shaft adapter 14, e.g. by means of first teeth 27 on a central aperture 28 that engage second teeth 29 on an outer surface of the shaft adapter 14. The driver 26 has a central body 62, a first arm 12a and a second arm 12b. The driver 26 has a first adapter drive surface 64 on one side of the first arm 12a, which is engageable with the first spring end 40 of the first spring 16a and a second adapter drive surface 66 on one side of the second arm 12b, which is angularly spaced from the first adapter drive surface 64 by an adapter drive surface spacing S1, and which is engageable with the second spring end 42 of the first spring 16a. The driver 26 has another first adapter drive surface 64 on another side of the second arm 12b and a second adapter drive surface 66 on another side of the first arm 12a, which are angularly spaced from each other by the spacing S1 and which are engageable with the first and second spring ends 42 of the second spring 16b. While there are many first and second teeth 27 and 29 shown in the Figures, it will be understood that fewer teeth may be suitable in many cases.

The driver 26 may be made from any suitable material such as a suitable steel.

The pulley 12 includes an endless drive member engagement surface 13 (FIG. 5) that is engageable with the endless drive member 52 (FIG. 1) and is rotatably mounted to the shaft adapter 14 (e.g. by means of a ball bearing 11 that directly supports the pulley 12 on the adapter 14), and by first and second bushings 102 positioned to indirectly support the pulley 12 on the adapter 14, so that the pulley 12 is rotatable relative to the shaft adapter 14. In some embodiments, the endless drive member engagement surface 13 is configured to engage a V-belt and includes sheave grooves 22 (FIGS. 4 and 5). In some embodiments, the radial position of the endless drive member engagement surface 13 is based on the bottom (lowest radial point in respect of the shaft adapter axis A) of the sheave grooves 22. In some embodiments, the radial position of the endless drive member engagement surface 13 is based on the peaks of the sheave grooves 22 (the outermost radial point on the sheave groove 22).

Furthermore, as shown in FIG. 4, at least one isolation spring of the isolation spring arrangement 16, such as the first springs 17a, is axially offset from the endless drive member engagement surface 13. In the example isolator 10, the first springs 17a include a lateral spring edge 20 that is spaced axially away from a lateral edge 21 of the rotary drive member 12 by a distance P.

Also, the at least one isolator spring, first springs 17a in the example isolator 10, has an outer edge 19 that is radially spaced outside the endless drive member engagement surface 13, for example by a distance Q. In some embodiments, as shown in FIG. 4, the outer edge 19 is radially outside a Diameter of Balls (DOB) 23 of the rotary drive member 12. In the example isolator 10, the DOB 23 is radially outside the drive member engagement surface 13.

A spring shell 104 shown in FIGS. 2 and 3 may be provided to hold the springs 17a and 17b, and may be frictionally held in a chamber 106 (FIG. 5) in the pulley 12 that is covered by a cover member 108 so as to rotationally lock the spring shell 104 with the pulley 12. Additionally radial projections and valleys on the spring shell 104 that mate with corresponding radial valleys and projections on the pulley 12 may assist in locking the spring shell 104 rotationally with the pulley 12.

The spring shell 104 may be formed from two shell halves 104a and 104b which are joined together by rivets 105 (FIG.

3). The spring shell 104 may be made from any suitable material such as nylon impregnated with PTFE.

With reference to FIG. 6, a first pulley-associated drive surface 82 that is engageable with the first spring end 40 of the first spring arrangement 16*a*, and a second pulley-associated drive surface 84 that is angularly spaced from the first pulley-associated drive surface 82 by a pulley associated drive surface spacing S2, and that is engageable with the second spring end 42 of one of the spring arrangements 16. The pulley 12 has another first pulley drive surface 82 that is engageable with the first spring end 40 of the second spring arrangement 16*b*, and another second pulley drive surface 84 that is angularly spaced from the first pulley drive surface 86 (also by the spacing S2), and that is engageable with the second spring end 42 of the second spring arrangement 16*b*.

As can be seen in FIG. 6, one of the adapter and pulley drive surface spacings S1 and S2 is larger than the other of the adapter and pulley drive surface spacings S1 and S2. In the example embodiment shown in FIG. 6, the spacing S1 is larger than the spacing S2. However, it is alternatively possible for the spacing S1 between the adapter drive surfaces 64 and 66 to be smaller than the spacing S2 between the pulley drive surfaces 82 and 84.

As a result of having one spacing S1 or S2 be larger than the other, when transitioning from torque transfer from the shaft adapter 14 to the pulley 12 to torque transfer from the pulley 12 to the shaft adapter 14, the second adapter drive surfaces 66 engage the second spring ends 42 (via the end members 6*b*) at a different time than the first adapter drive surfaces 64 disengage from the first spring ends 40, and the second pulley drive surfaces 84 disengage from the second spring ends 42 at a different time than the first pulley drive surfaces 82 engage the first spring ends 40. Analogously, when transitioning from torque transfer from the pulley 12 to the shaft adapter 14 to torque transfer from the shaft adapter 14 to the pulley 12 the first adapter drive surfaces 64 engage the first spring ends 40 at a different time than the second adapter drive surfaces 66 disengage from the second spring ends 42, and the first pulley drive surfaces 82 disengage from the first spring ends 40 at a different time than the second pulley drive surfaces 84 and 88 engage the second spring ends 42. The difference in the gaps S1 and S2 may be less than about 10 degrees angularly. Providing a difference in the gaps S1 and S2 is further described in pending PCT application PCT/CA2014/000456, the contents of which are incorporated herein by reference in their entirety.

As a result of having one spacing S1 or S2 be larger than the other, when transitioning from torque transfer from the shaft adapter 14 to the pulley 12 to torque transfer from the pulley 12 to the shaft adapter 14, the second adapter drive surfaces 66 engage the second spring ends 42 at a different time than the first adapter drive surfaces 64 disengage from the first spring ends 40, and the second pulley drive surfaces 84 disengage from the second spring ends 42 at a different time than the first pulley drive surfaces 82 engage the first spring ends 40. Analogously, when transitioning from torque transfer from the pulley 12 to the shaft adapter 14 to torque transfer from the shaft adapter 14 to the pulley 12 the first adapter drive surfaces 64 engage the first spring ends 40 at a different time than the second adapter drive surfaces 66 disengage from the second spring ends 42, and the first pulley drive surfaces 82 disengage from the first spring ends 40 at a different time than the second pulley drive surfaces 84 and 88 engage the second spring ends 42.

In order to keep the kinetic energies of the impacts sufficiently low, the spacing difference is selected, based on one or more of several parameters (and preferably all of these parameters). The parameters include the moment of inertia of the pulley, the moment of inertia of the shaft adapter, the maximum amount of torque that the isolator 10 will be designed to transfer, the materials that make up the adapter drive surfaces 64 and 66 and the materials that make up the pulley drive surfaces 82 and 84.

As stated above, the second arcuate helical compression springs, depicted as the second springs 17*b*, are shorter than the first arcuate helical compression springs, depicted as the first springs 17*a*. As shown in FIG. 6, this difference in length allows for the selected engagement of one or both of the first springs 17*a* and the second springs 17*b*. For example, through a first angular range V1 of relative movement between the rotary drive member, pulley 12, and the shaft adapter 14, there is compression of the first springs 17*a*, but not of the second springs 17*b*. Beyond the first angular range V1, shown as a second angular range V2 of relative movement, there is compression of both the first springs 17*a* and the second springs 17*b*. As a result, the effective spring rate can be adjusted based on the range of relative movement between the rotary drive member 12 and the shaft adapter 14.

Figure 7:
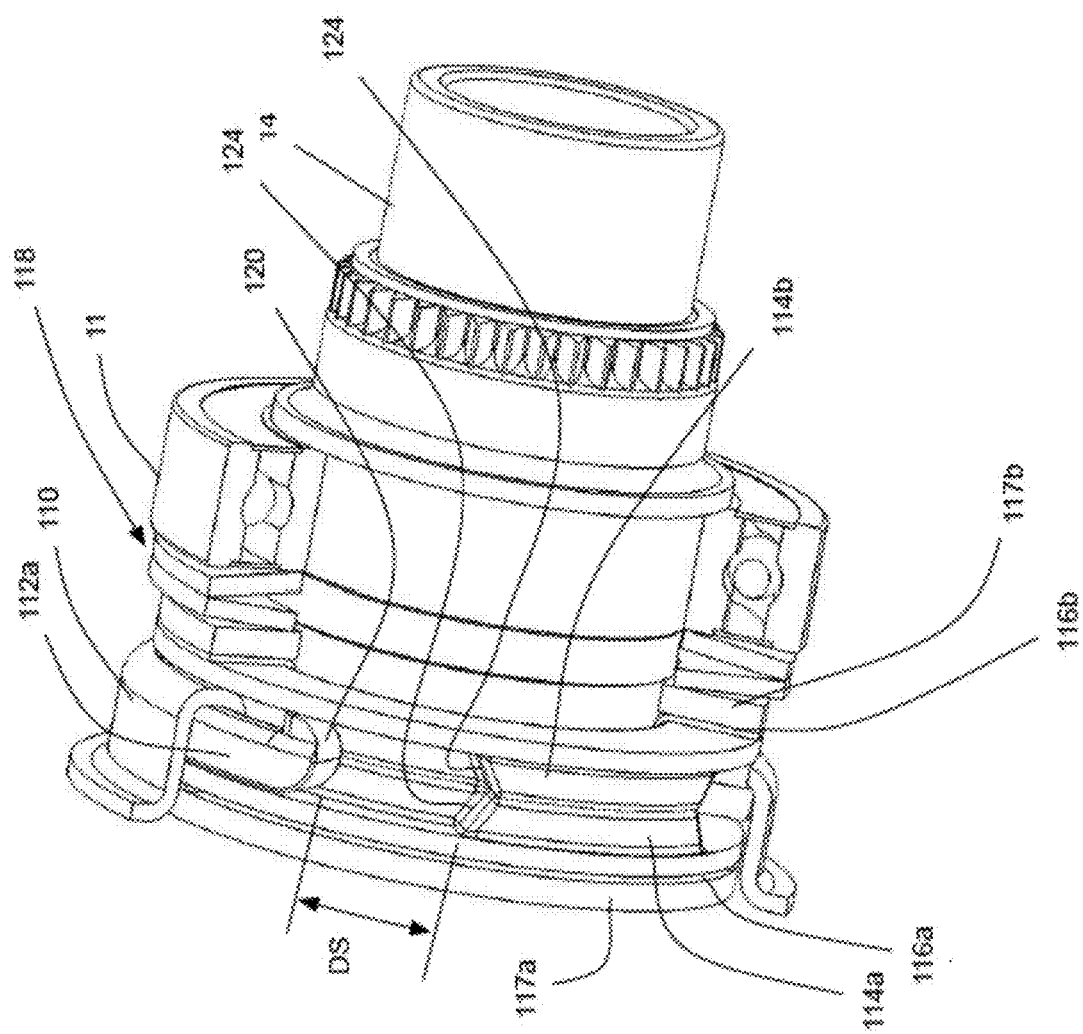
FIG. 7 is a perspective view of the isolator shown in FIG. 1 without a rotary drive member thereon with a damping structure in a first position.
Figure 8:
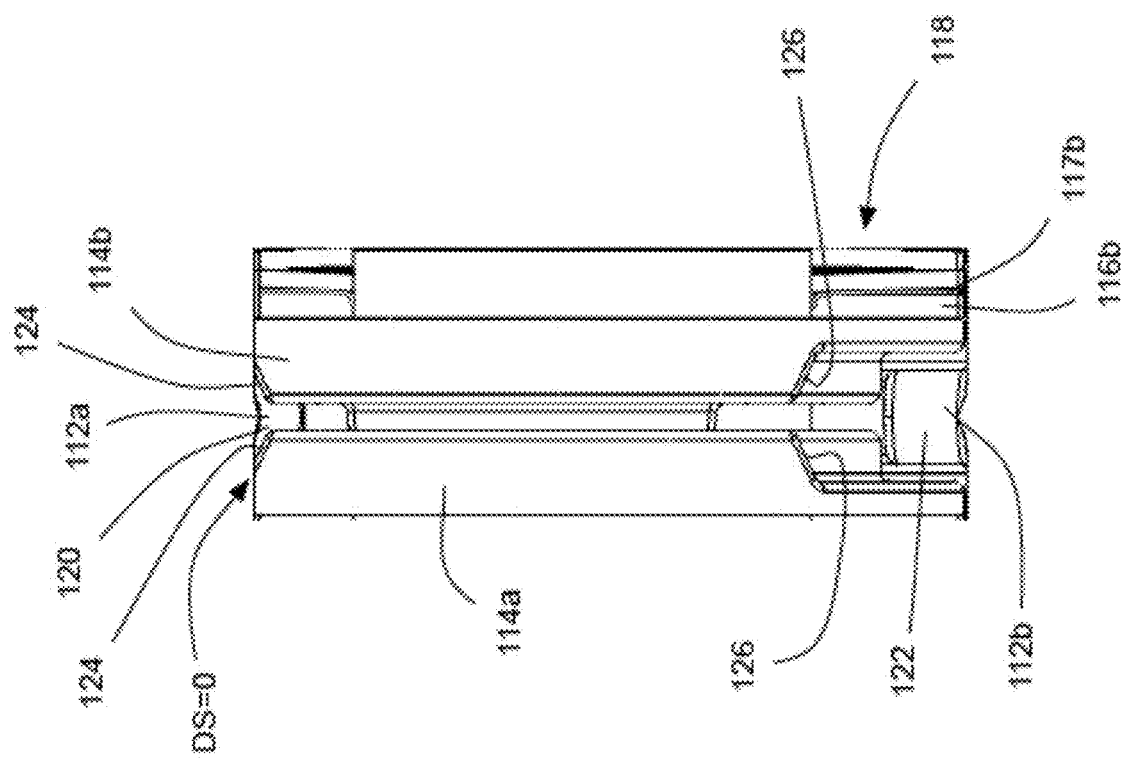
FIG. 8 is a perspective view of the isolator shown in FIG. 1 without a rotary drive member thereon with the damping structure in a second position.

Referring to FIGS. 2 and 7, the damping structure 18 is configured to exert a damping force between the pulley 12 and the shaft adapter 14 within a selected angular range of positions. The damping structure 18 includes a damping structure driver 110 that has first and second spreader members 112*a* and 112*b* fixedly attached thereto, first and second force transfer members 114*a* and 114*b*, first and second friction members 116*a* and 116*b*, first and second thrust washers 117*a* and 117*b*, and a damping structure biasing arrangement 118. The damping structure driver 110 is rotationally fixed with the pulley 12. Referring to FIGS. 7 and 8, the spreader members 112*a* and 112*b* each have first and second spreader member engagement surfaces 120 and 122 thereon which are engageable with first and second force transfer member engagement surfaces 124 and 126 on each of the force transfer members 114*a* and 114*b*. The spreader member engagement surfaces 120 and 122 may be generally cylindrical in shape, while the force transfer member engagement surfaces 124 and 126 may be at any selected angle (such as, for example, about 45 degrees relative to the axis A) to transfer the circumferential movement of the spreader members 120 and 122 into axial movement of the force transfer members 114*a* and 114*b*. The axial movement of the force transfer members 114*a* and 114*b* causes compression of the biasing arrangement 118 which increases the normal force (and therefore the frictional damping force) between the thrust washers 117*a* and 117*b* and the friction members 116*a* and 116*b*. It will be understood that there is some axial play in the position of the driver 110 (and therefore the spreader members 120 and 122).

FIG. 7 shows the position of the spreader members 112*a* and 112*b* relative to the force transfer members 114*a* and 114*b* when the engine is idling. As can be seen, there is a selected spacing between the spreader members 112*a* and 112*b* and the force transfer members 114*a* and 114*b* when the engine is at idle. The spacing is represented by DS. The damping structure 18 is configured to provide a first damping force when the pulley 12 and the shaft adapter 14 are at a first relative position (shown in FIG. 7) corresponding to a spacing DS that is greater than zero. The first damping force may optionally be zero or it may be a selected non-zero damping force. The damping structure 18 is configured to provide a second damping force (that is greater then the first damping force) when the pulley 12 and the shaft adapter 14 are at a second relative position (shown in FIG. 8) that corresponds to a spacing DS that is zero (i.e. corresponding to engagement between the spreader members 112*a* and 112*b* and the force transfer members 114*a* and 114*b*).

The biasing arrangement 118 may include any suitable structure, such as a pair of Belleville washers that have one end in abutment with the bearing 11 (FIG. 7) and the other end in abutment with the thrust washer 117*b*.

Because the thrust washer 117*a*, the friction member 116*a* and the force transfer member 114*a* are essentially fixed in position, it will be noted that the spreader members 112 will be axially floating so as to ensure that they can adjust axially as necessary to remain centered axially between the force transfer members 114*a* and 114*b* so as to transfer force substantially equally into the force transfer members 114*a* and 114*b*.

Referring to FIGS. 2 and 4, a dust cover is shown at 132 for protecting the isolator internals from dust and debris. At the other axial end of the isolator 10, a seal member 134 is provided for sealing the space between the cover 108 and the shaft adapter 14.

Figure 9:
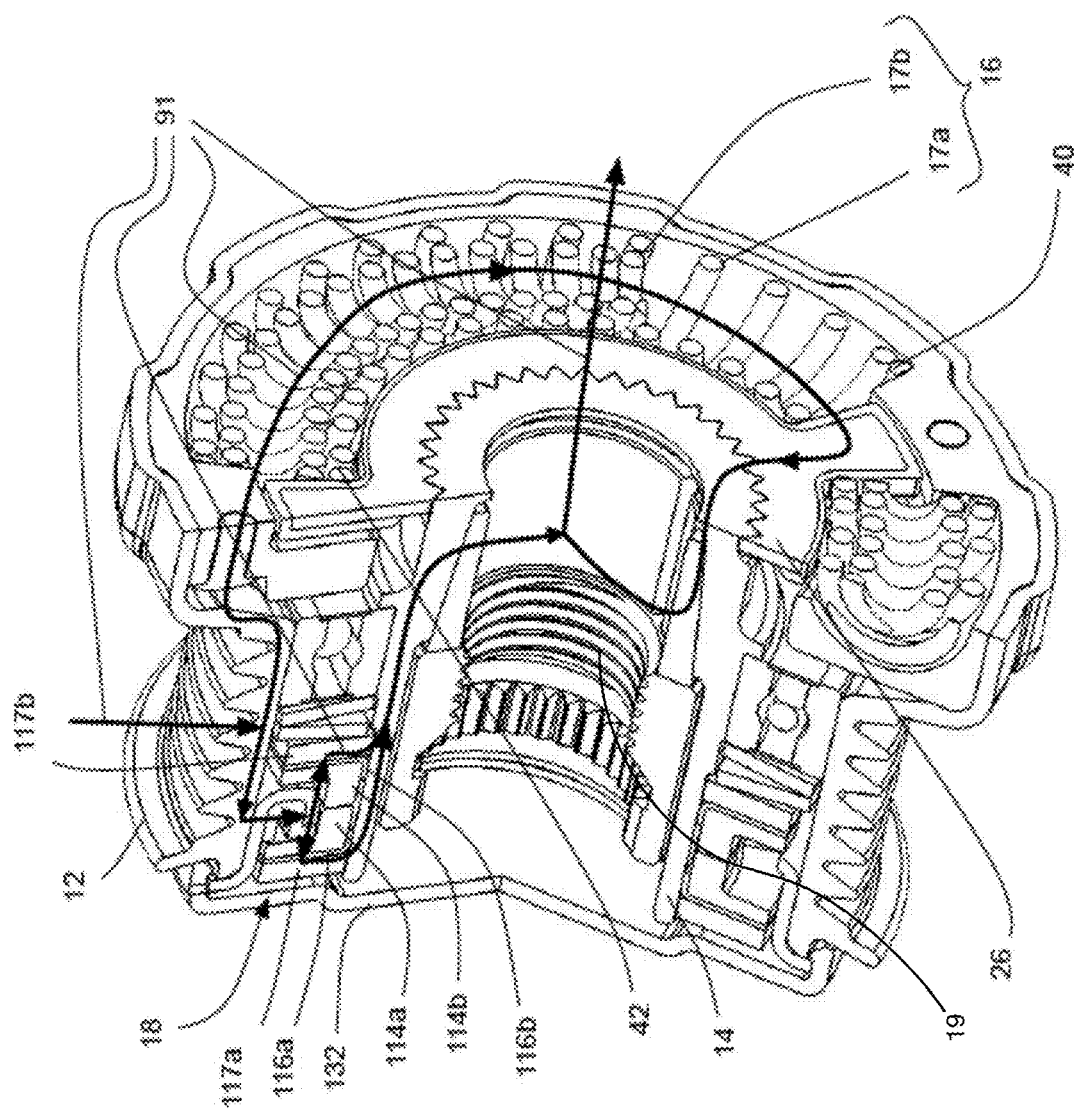
FIGS. 9 and 10 are cutaway perspective views of the isolator shown in FIG. 1 that show the torque path through the isolator under different conditions.

FIG. 9 shows the torque transfer (see arrows 91) from the pulley 12 to the shaft adapter 14, as would occur during a key start of the engine 51 (FIG. 1), which is a start of the engine 51 by the engine's starter motor, and not by the MGU 53. During such a start the relative angular movement between the pulley 12 and the shaft adapter 14 is sufficiently large that all of the spacing DS is taken up and the damping structure 18 is at the position shown in FIG. 8 so that some damping force is applied. As can be seen, in such a situation some of the torque is transferred from the pulley 12 to the spring arrangements 16 through the first spring ends 40, and from the spring arrangements 16 to the shaft adapter 14 through the second spring ends 42, while some of the torque is transferred from the pulley 12 frictionally through the damping structure 18 and from the damping structure 18 into the shaft adapter 14. In other words, the damping structure 18 is configured to transfer torque between the pulley 12 and the shaft adapter 14 in parallel with the isolation spring arrangements 16 but only in situations where the relative movement between the pulley 12 and the shaft adapter 14 is greater than a selected amount away from a neutral position (i.e. from the position when the engine is off). The selected amount of relative movement corresponds to the amount of torque transfer that takes place when the engine is started via the engine's starter motor (not shown) and when other large load changes occur. It will also be noted that the selected amount of relative movement is selected to prevent lock up of the spring arrangements 16 (i.e. it is selected to prevent the springs 17*a* and 17*b* from being compressed to the point where there is no longer any gap between their coils and they therefore 'go solid'), which can damage the springs 17*a* and 17*b*, and which can lead to binding of the springs 17*a* and 17*b* in these compressed positions.

Figure 10:
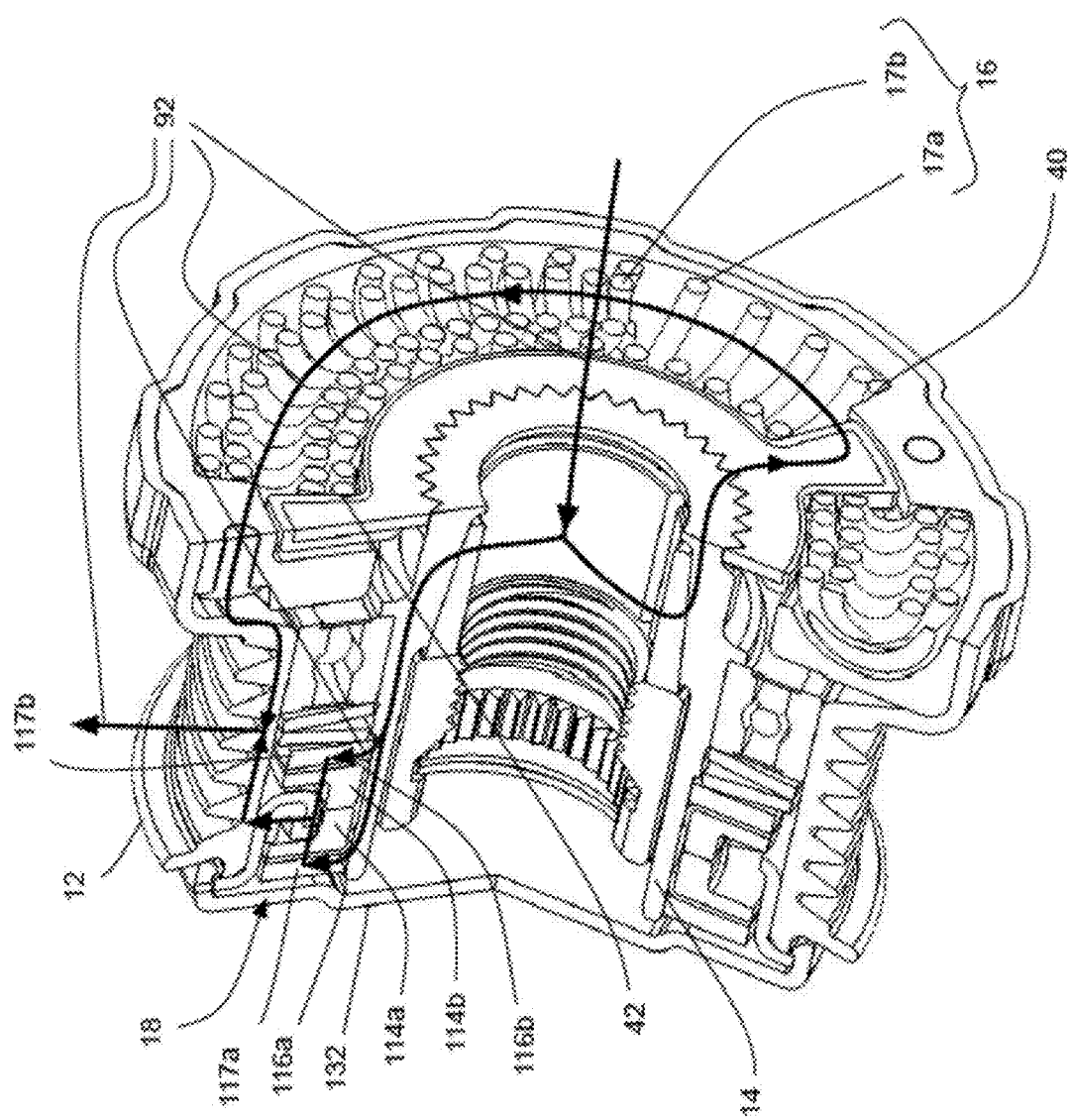

FIG. 10 shows the torque transfer that takes place in a mode where the MGU shaft 53*a* (FIG. 4) drives the pulley 12, (e.g. so as to transfer power to the engine's crankshaft 50*a* to start the engine in a BAS event). As can be seen, torque is transferred from the shaft 53*a* (not shown in FIG. 10) to the shaft adapter 14, and from the shaft adapter 14 torque is transferred in parallel through the spring arrangements 16 and through the damping structure 18 when more than a selected amount of relative movement has taken place between the pulley 12 and the shaft adapter 14. The torque path in FIG. 10 is essentially the reverse of the torque path shown in FIG. 9. Torque is transferred from the shaft adapter 14 to the spring arrangements 16 through the driver 26, and from the spring arrangements 16 to the pulley 12. When the aforementioned relative movement is sufficiently large, torque is also transferred from the shaft adapter 14 to the pulley 12 through the thrust washers 117*a* and 117*b*, the friction members 116*a* and 116*b*, the force transfer members 114*a* and 114*b*, the spreader members 112*a* and 112*b* and the damping structure driver 110.

Figure 11:
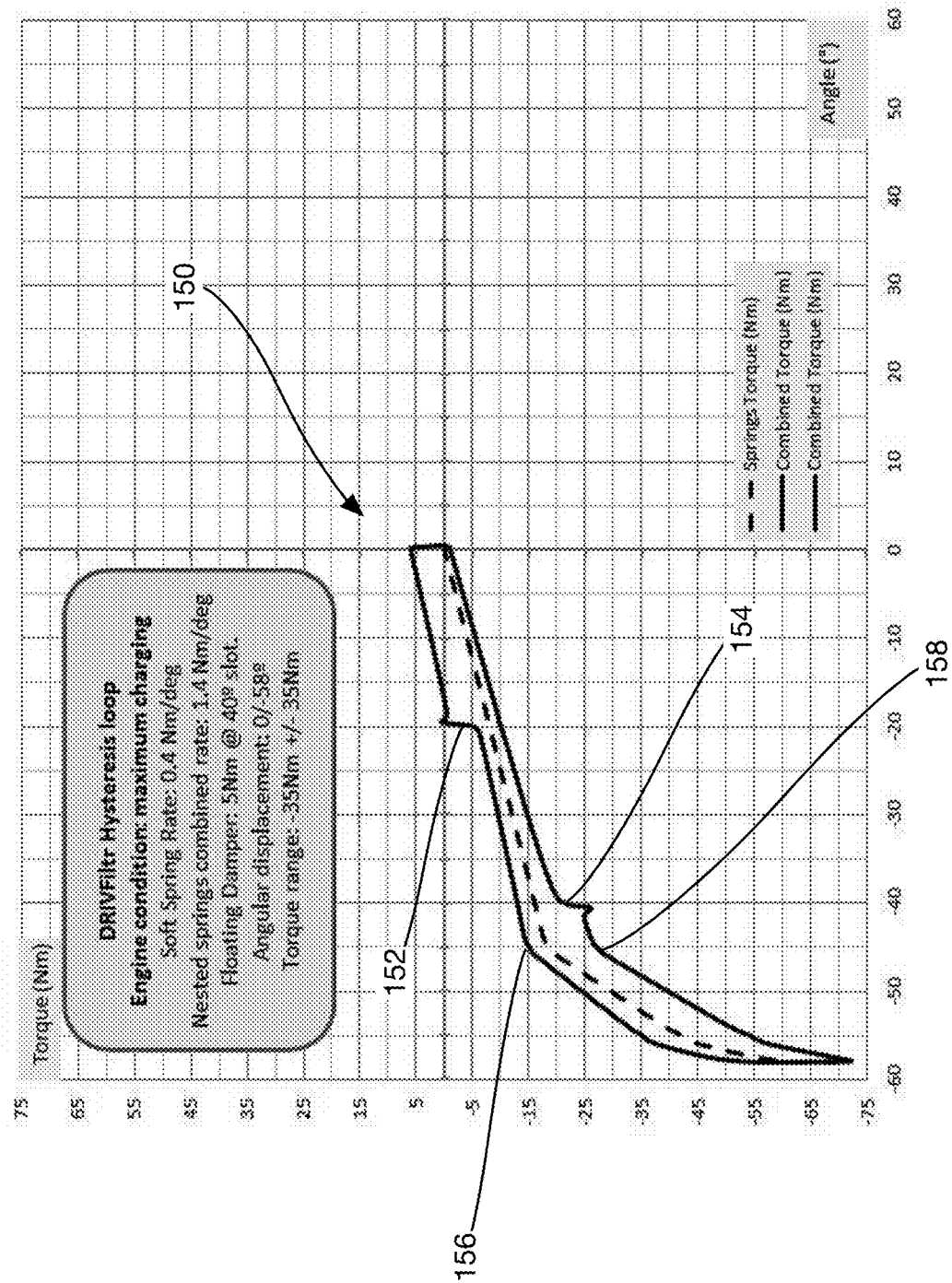
FIG. 11 is a graph illustrating the torque position relationship for the isolator shown in FIG. 1.

Reference is made to FIG. 11 which shows a torque transfer curve 150 for the isolator 10. Points 152 and 154 represent when the spacing DS is consumed and torque transfer begins to take place through the damping structure 18 in addition to taking place through the spring arrangements 16. As can be seen in FIG. 11, the selected amount of relative movement between the shaft adapter 14 and the pulley 12 before the damping structure 18 is engaged may be, for example, about 40 degrees. In the example shown in FIG. 11, points 156 and 158 represent when the second springs 17*b* start or stop contributing to the torque transfer.

It will be noted that the position-based damping structure 18 shown in FIGS. 6-10 is positioned to transfer torque via frictional damping force at a selected amount of relative movement between the rotary drive member 12 and the shaft adapter 14. The selected amount of relative movement is selected to be less than a permitted amount of flexure of the first isolation spring arrangement 16*a*. The amount of damping force may increase as the relative movement increases beyond the selected amount of relative movement (i.e. as the spreader members 112*a* and 112*b* further spread the force transfer members 114*a* and 114*b* apart, they cause progressively greater amounts of compression of the Belleville washers from biasing arrangement 118, which increases the damping force) sufficiently to prevent the spring arrangements 16 from going solid. In other words, the torque transfer increases through the damping structure 18 with displacement at a sufficiently high rate that the torque transfer exceeds the maximum torque that the isolator 10 is designed to handle. The amount of damping force may be high but is spread over a relatively large area, as the spreader members 112*a* and 112*b* drive frictional engagement of two friction members (members 116*a* and 116*b*) that span the circumference of the isolator 10, which is a relatively large area of engagement. This reduces the average temperature of the friction members 116*a* and 116*b*, which improves the longevity of the isolator 10.

By providing the damping structure 18 or 160, the isolator 10 can be used with arcuate helical compression springs 17*a* and 17*b* while ensuring that situations do not occur where the springs 17*a* and 17*b* go solid. Using arcuate helical compression springs is beneficial due to the relatively low axial height of the isolator 10.

Figure 12:
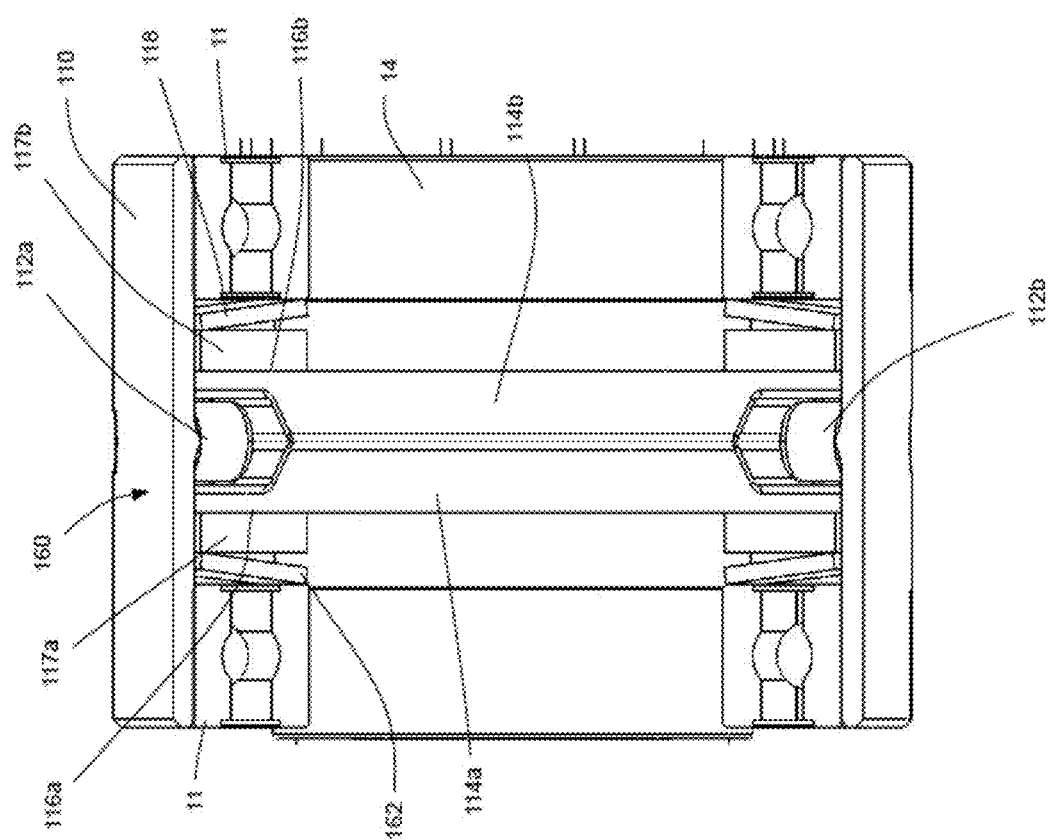
FIG. 12 is side elevation view of an alternative damping structure for the isolator shown in FIG. 1.

Reference is made to FIG. 12 which shows an alternative damping structure 160. The damping structure 160 may be similar to the damping structure 18, but includes a second damping structure biasing arrangement 162 so that the thrust washer 117*a*, the friction member 116*a* and the force transfer member 114*a* are not axially fixed in position but are instead axially movable and biased towards the force transfer member 114*b*, the friction member 116*b* and the thrust washer 117*b*. In this embodiment the spreader members 112*a* and 112*b* need not be axially movable—they can be fixed axially. This transfers the force more evenly into the first and second force transfer members 114*a* and 114*b* thereby producing more even damping forces on the two friction members 116*a* and 116*b*.

A second bearing 11 is shown in FIG. 12 also, for supporting the pulley on the shaft adapter. Additionally, the friction members of the embodiment shown in FIG. 12 may be coatings on the force transfer members 114a and 114b instead of being separate elements as they are in the embodiment shown in FIGS. 6-10.

While two springs 17a and 17b are shown for each spring arrangement 16, it will be understood that it is alternatively possible to only have one spring (e.g. spring 17a) in each spring arrangement 16.

FIGS. 13 to 17 show another example isolator 200. The isolator 200 shares at least some features in common with the example isolator 10, with similar features given similar numbers. The isolator 200 is also configured to isolate a device driven by an engine from torsional vibrations transmitted from the engine crankshaft to the device. Similarly to the isolator 10, the device can be an MGU, such as the MGU 53, or an alternator. The engine may be engine 51.

Figure 13:
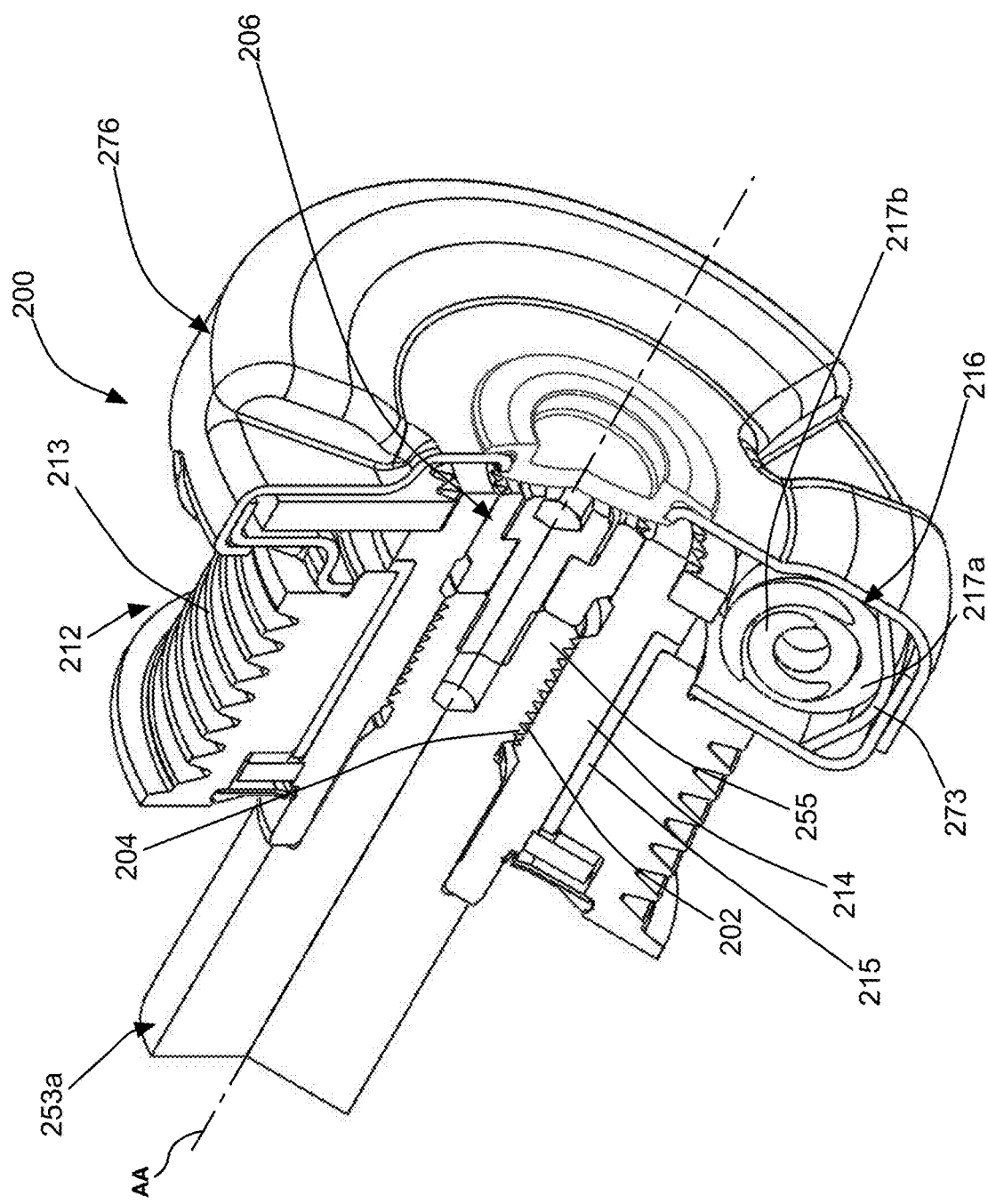
FIG. 13 is a cutaway perspective view of an isolator on a shaft of an MGU (motor-generator unit), in accordance with a second non-limiting embodiment.
Figure 14:
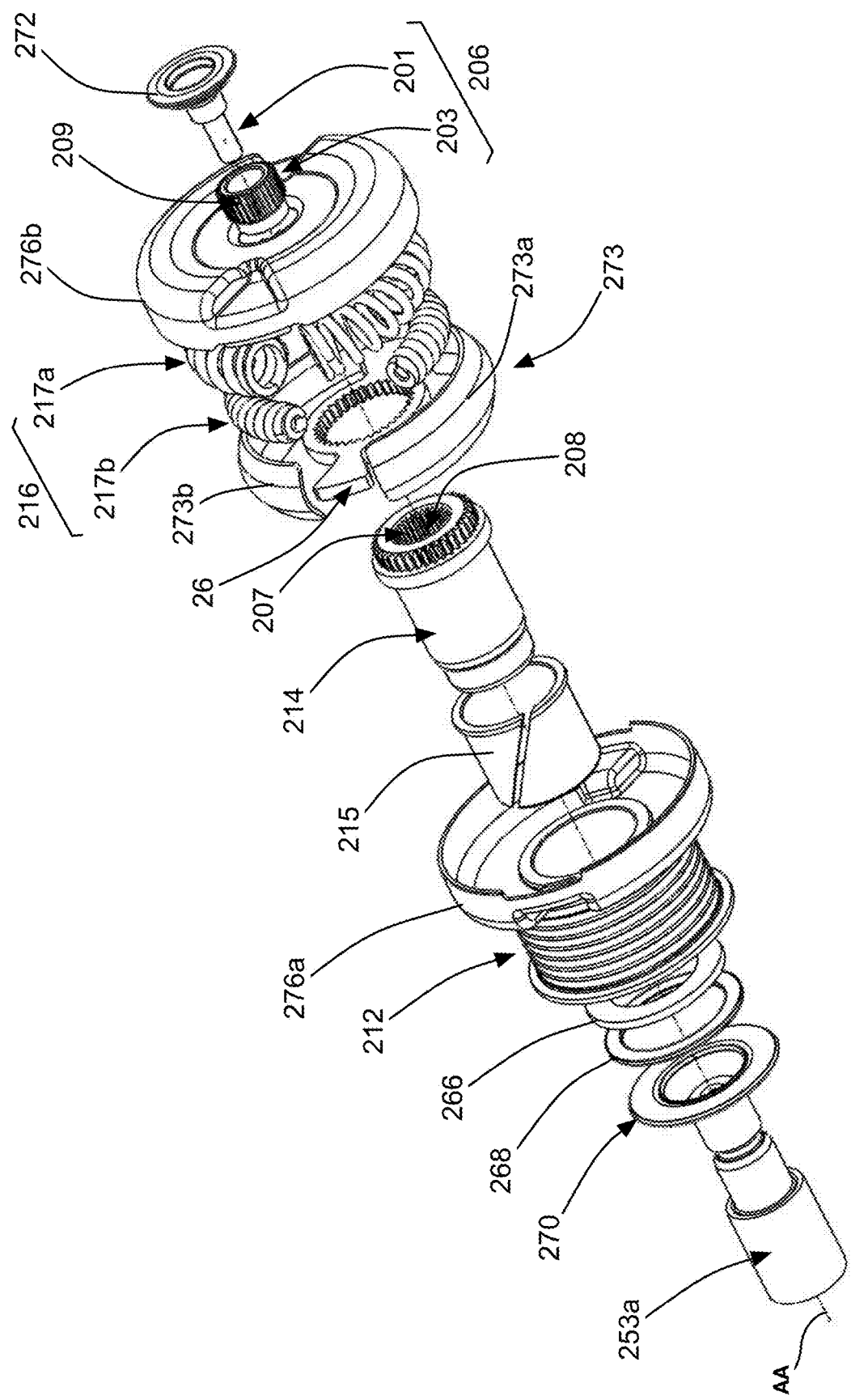
FIG. 14 is an exploded view of the isolator shown in FIG. 13.

Similarly to the isolator 10, the isolator 200 includes a shaft adapter 214, a rotary drive member 212 and an isolation spring arrangement 216. The shaft adapter 214 defines a shaft adapter axis AA (FIG. 14) and is connectable with a shaft of the device, such as a shaft 253a of an MGU (not shown), in any suitable manner. For example, as shown in FIG. 13, the shaft adapter 214 includes a first internal threaded section 202 that is configured to engage an external threaded section 204 at an end 255 of the shaft adapter 214. A plug assembly 206 is engaged with both the shaft 253a and the isolator 200. In particular, the plug assembly 206 is engaged with the shaft 253a at the end 255 and with the shaft adapter 214 via internal shaft adapter engagement teeth 207 (FIG. 14) on a central aperture 208 of the shaft adapter 214 that engage second teeth 209 on an outer surface of the plug assembly 206. As shown in FIG. 14, the plug assembly includes a shaft engagement member 201 and an isolator engagement member 203. It is understood that FIGS. 13 to 17 show only one example of a manner of connecting the shaft 253a to the shaft adapter 214.

Figure 15:
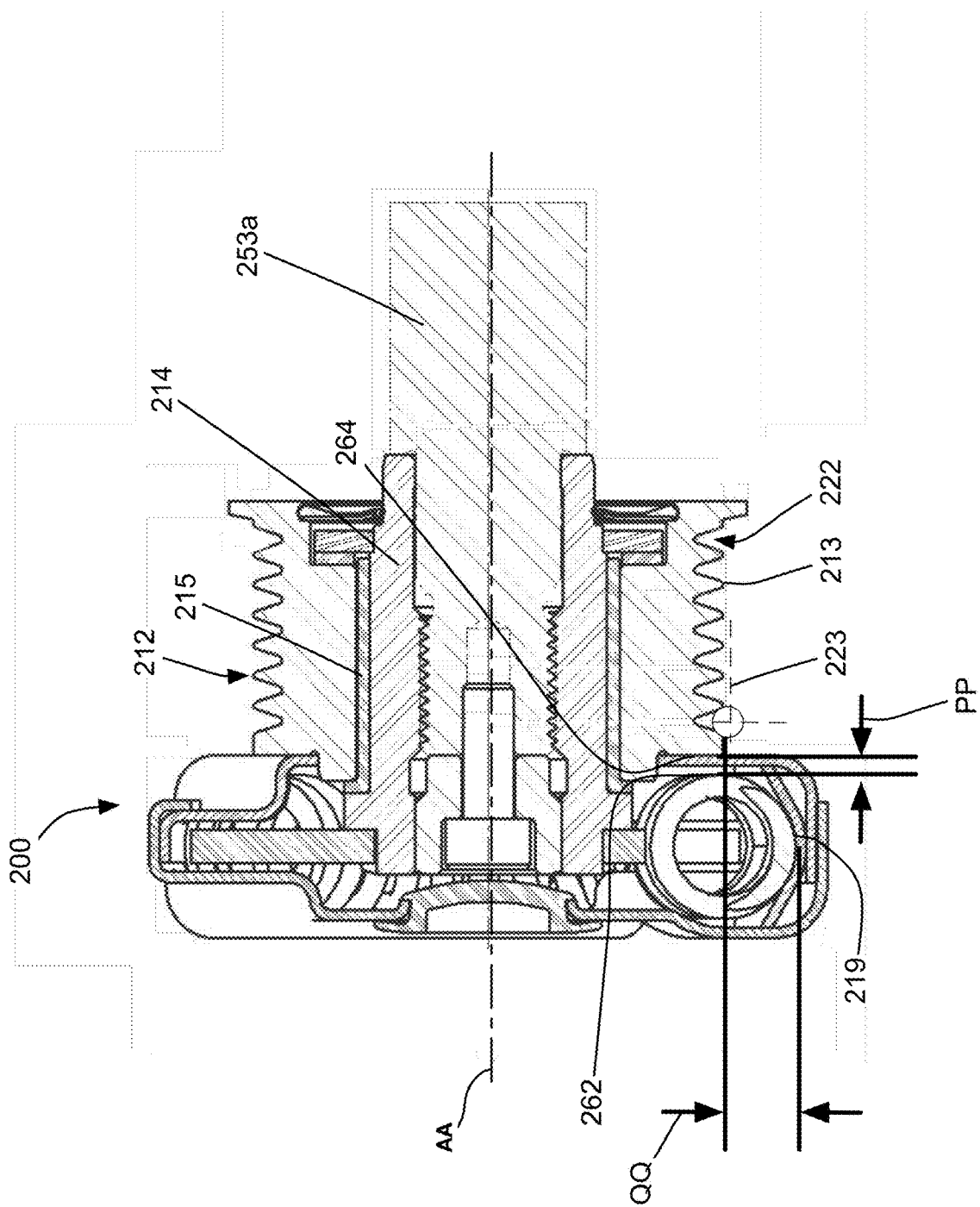
FIG. 15 is a cross-section view of the isolator shown in FIG. 13.

Similarly to the rotary drive member 12 of the isolator 10, the rotary drive member 212 is rotatable relative to the shaft adapter 214 and includes an endless drive member engagement surface 213. The endless drive member engagement surface 213 is engageable with an endless drive member of the engine, such as the endless drive member 52. The rotary drive member 212 may also be referred to herein as a pulley 212. However, it is understood that the rotary drive member 212 is not necessarily limited to a pulley but may be any suitable rotary drive member. In some embodiments, the endless drive member engagement surface 213 is configured to engage a V-belt and includes sheave grooves 222 (FIG. 15). In some embodiments, the radial position of the endless drive member engagement surface 213 is based on the bottom (i.e., the lowest radial point in respect of the shaft adapter axis A) of the sheave grooves 222. In some embodiments, the radial position of the endless drive member engagement surface 213 is based on the peaks of the sheave grooves 222 (i.e., the outermost radial point on sheave grooves 222).

As shown in FIGS. 14 and 15, the rotary drive member 212 may be rotationally supported on the shaft adapter 214 by a bushing 215 therebetween. By including the bushing 215 rather than the ball bearing 11, a smaller diameter rotary drive member may be used, which may be desirable in installations in which the clearance between the isolator and other devices is a concern.

Similarly to the isolator 10, the isolation spring arrangement 216 is positioned to transfer torque between the shaft adapter 214 and the rotary drive member 212. The isolation spring arrangement 216 is configured similarly to the isolation spring arrangement 16 and includes at least one isolation spring, such as first springs 217a and second springs 217b. The first springs 217a and the second springs 271b are configured similarly to the first springs 17a and the second springs 17b. For example, as shown in FIG. 15, at least one isolation spring of the isolation spring arrangement 216, such the first springs 217a, is axially offset from the endless drive member engagement surface 213. In the example isolator 200, the first springs 217a include a lateral spring edge 262 that is spaced axially away from a lateral edge 264 of the rotary drive member 212 by a distance PP.

As in the isolator 10, the at least one isolator spring, first springs 217a in this case, has an outer edge 219 that is radially outside the endless drive member engagement surface 213. As shown in FIG. 15, the outer edge 219 is radially spaced outside the endless drive member engagement surface 213 by a distance QQ. Similarly to the isolator 10, the first springs 217a and the second springs are arcuate helical compression springs. As shown in FIG. 13, the second springs 217b can be nested within the first springs 217a. In some embodiments, the first springs 217a has a first spring rate and the second springs 217b have a second spring rate. In some embodiments, the second spring rate is different than the first spring rate.

In some embodiments, as shown in FIG. 15, the outer edge 219 is radially outside a Diameter of Balls (DOB) 223 of the rotary drive member 12. In the example isolator 200, the DOB 223 is radially outside the drive member engagement surface 213.

The isolator 200 also includes the driver 26. The driver 26 is fixedly mounted to the shaft adapter 214 in a similar manner to that of the isolator 10. A thrust bushing 266 and a thrust washer 268 are included to help position the rotary drive member 212 axially in respect of the shaft adapter 214. A first seal 270 and a second seal 272 are included to prevent dust and debris from entering the isolator 200 (FIG. 14).

As shown in FIGS. 13 and 14, the isolator 200 can include a spring sleeve 273 that is connected to the rotary drive member 212 and at least partially encloses the isolation spring arrangement 216 therein. The spring sleeve 273 can be made of two sleeve halves, such as a first spring sleeve half 273a and a second spring sleeve half 273b. The spring sleeve 273 can be made form any suitable material, such as a suitable metal.

Furthermore, the isolator 200 includes a spring shell 276 that at least partially encloses the isolation spring arrangement 216, the driver 16 and the spring sleeve 273 therein. The shell 276 includes a first shell half 276a and a second shell half 276b (FIG. 14). The shell may be made from any suitable material.

Figure 16:
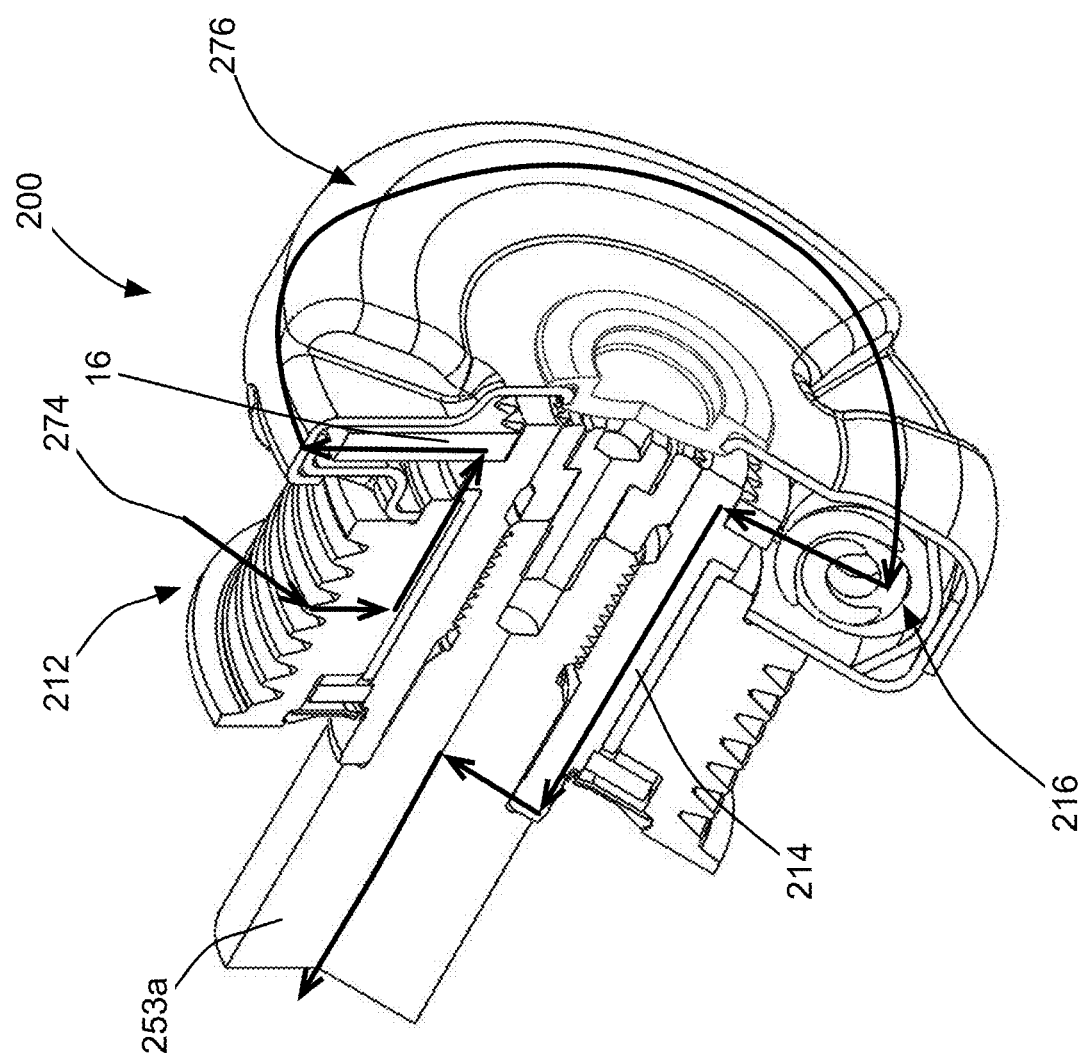
FIGS. 16 and 17 are cutaway perspective views of the isolator shown in FIG. 13 that show the torque path through the isolator under different conditions.

FIG. 16 shows the torque transfer (see arrows 274) from the rotary drive member 212 to the shaft adapter 214, as would occur during a key start of the engine 51 as described above. The torque would be provided by the endless drive member 52 to the rotary drive member 212 and is transmitted through the rotary drive member 212 to the driver 16 and the spring shell 276. The torque is transmitted from the driver 16 and the spring shell 276 through the isolation spring arrangement 216 to the shaft adapter 214. From the shaft adapter 214 the torque is transmitted to the shaft 253a to the MGU (not shown).

Figure 17:
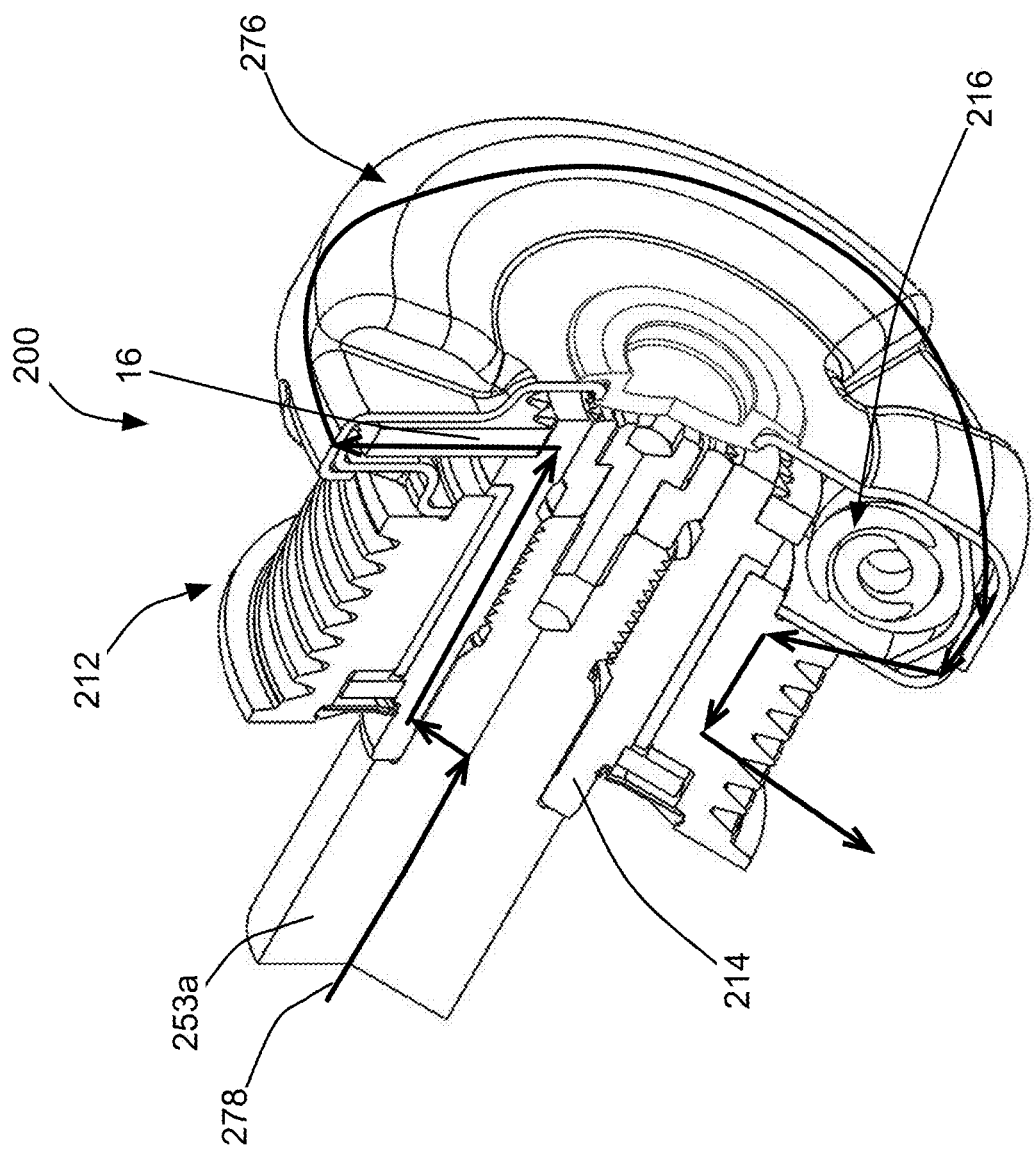

FIG. 17 shows the torque transfer that takes place in a mode where the MGU shaft 253a drives the rotary drive member 212 (e.g., so as to transfer power to the engine's crankshaft 50a to start the engine in a BAS event). As shown, torque (indicated by arrows 278) is transferred from the shaft 253a to the driver 16 via the shaft adapter 214. The torque is transmitted from the driver 16 to the spring shell 276 and the isolation spring arrangement 216. The torque is transmitted from the spring shell 276 and the isolation spring arrangement 216 through the rotary drive member 212 to the endless drive member 52.

Figure 18:
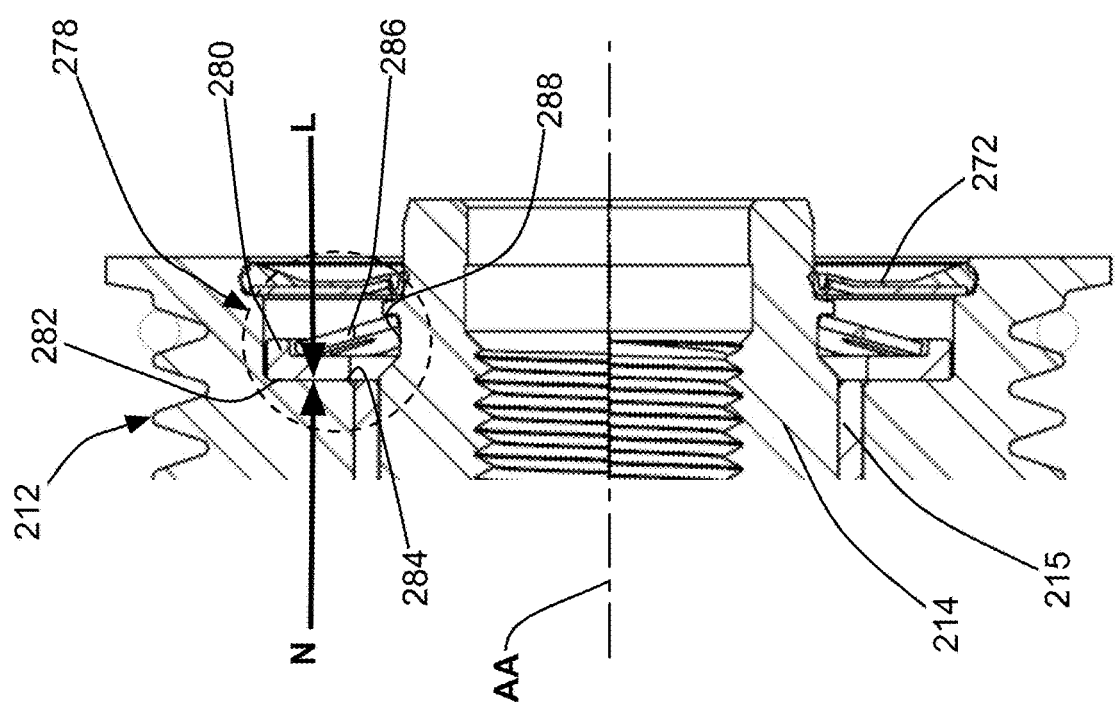
FIG. 18 shows an enlarged view of a cross-section of the isolator shown in FIG. 13 modified to include a damping structure, according to a non-limiting embodiment.

The isolator 200 can include features to generate a frictional torque to resist relative rotation between the shaft adapter 214 and the rotary drive member 212, providing at least some damping. FIG. 18 depicts an enlarged view of a cross-section of the isolator 200 modified to include an example of such features. In particular, the isolator 200 can include a damping structure 278. The damping structure 278 includes a first damping surface that is rotationally fixed relative to one of the shaft adaptor 214 and the rotary drive member 212 and a second damping surface that is rotationally fixed relative to the other one of the shaft adapter 214 and the rotary drive member 212. For example, the damping structure 278 may include a damping member 280 that has the first damping surface (shown as a damping member exterior surface 282). In the example shown, the second damping surface may be included with the rotary drive member 212 as a rotary drive member damping surface 284. The damping member 280 is at least partially annular about the shaft adapter axis AA. In the example shown, the damping member 280 is a thrust washer. However, any structure, component or combination of components suitable as the damping member 280 is contemplated.

Figure 19:
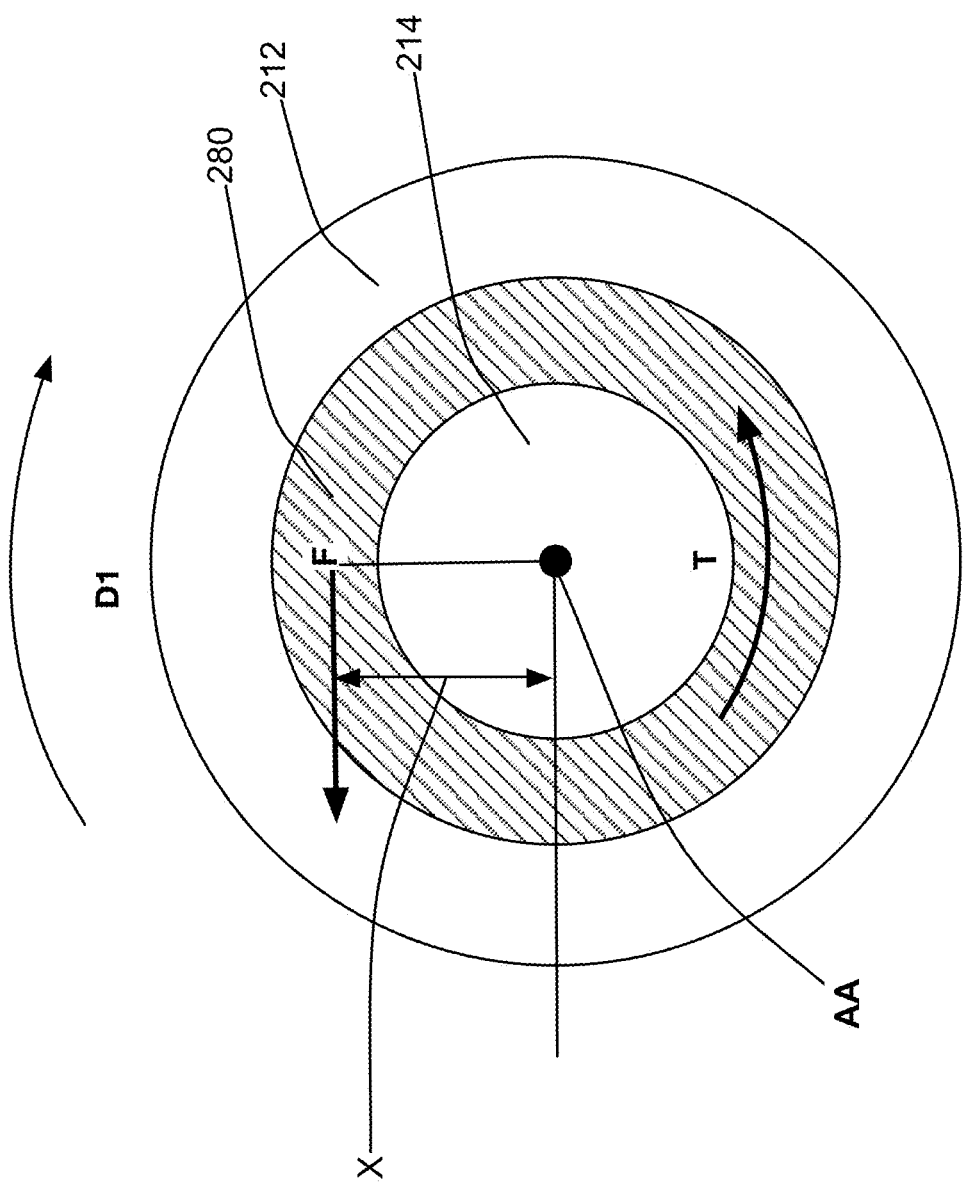
FIG. 19 shows a schematic of the isolator shown in FIG. 18 when a frictional torque is generated to resist relative movement between the rotary drive member and the shaft adapter, according to a non-limiting embodiment.

The damping structure 278 further includes a damping structure biasing member 286. The damping structure biasing member 286 urges the first and second damping surfaces (e.g., the damping member exterior surface 282 and the rotary drive member damping surface 284) into engagement with one another to generate a frictional torque T to resist relative rotation between the shaft adapter 214 and the rotary drive member 212 about the shaft adapter axis AA, as shown in FIG. 19.

For example, the damping structure biasing member 286 biases the damping member 280, and the damping member exterior surface 282, into frictional engagement with the second damping surface, the rotary drive member damping surface 284. As shown in FIG. 18, the damping member 280, via the damping member exterior surface 282, applies an engagement force L to the rotary drive member damping surface 284. In response, a normal reaction force N is generated at the rotary drive member damping surface 284.

As the rotary drive member 212 rotates in the direction D1 (FIG. 19) relative to the shaft adapter 214, a friction force F is generated at the damping member exterior surface 282 at a distance X from the shaft adapter axis AA, producing the frictional torque T in a direction of rotation that is opposite to D1. For clarity, the damping structure biasing member 286 is omitted from FIG. 19.

Although the first damping surface and the second damping surface are shown as surfaces included with the damping member 280 and the rotary drive member 212, the first damping surface and the second damping surface are not necessarily included with the damping member 280 and the rotary drive member 212. For example, in some embodiments, at least the second damping surface is included on the shaft adapter 214, such as an exterior shaft adapter surface 288 (FIG. 18). In this example, the damping member 280 may be configured such that the damping member exterior surface 282 is urged into frictional engagement with the exterior shaft adapter surface 288.

In some embodiments, the damping structure biasing member 286 is a Belleville washer. However, any suitable structure, component or combination of components that urge the first damping surface and the second damping surface into engagement with one another to generate the frictional torque T is contemplated.

While the above description constitutes a plurality of embodiments of the present invention, it will be appreciated that the present invention is susceptible to further modification and change without departing from the fair meaning of the accompanying claims.

TABLE OF ELEMENTS:

| Reference # | Item | FIG. # |
|---|---|---|
| 10 | isolator | 1 |
| 11 | ball bearing | 2 |
| 12 | pulley (rotary drive member) | 2 |
| 12a | first arm (of the driver) | 3 |
| 12b | second arm (of the driver) | 3 |
| 13 | endless drive member engagement surface | |
| 14 | shaft adapter | 2 |
| 16 | at least one isolation spring arrangement | 3 |
| 17a | first springs | 3 |
| 17b | second springs | 3 |
| 18 | position-based damping structure | 2, 10 |
| 19 | radial outer edge of the first springs 17a | 4 |
| 20 | lateral spring edge | 4 |
| 21 | lateral edge (of the rotary drive member) | 4 |
| 22 | sheave grooves | 4, 5 |
| 23 | diameter of balls (DOB) | 4 |
| 26 | driver | 3, 5 |
| 27 | first teeth | 5 |
| 28 | central aperture | 3 |
| 29 | second teeth | 5 |
| 40 | first end (of the first spring) | 6 |
| 50 | crankshaft pulley | 1 |
| 50a | crankshaft | 1 |
| 51 | engine | 1 |
| 52 | endless drive member | 1 |
| 53a | shaft of MGU | 1 |
| 53 | motor-generator unit | 1 |
| A | shaft adapter axis | 2, 4 |
| 55 | shaft end | 4 |
| 57 | nut | 4 |
| 59 | bore | 4 |
| 61 | conical split bushing | 4 |
| 62 | central body (of the driver) | 3 |
| 63 | inner-conical surface | 4 |
| 64 | first adapter drive surface | 6 |
| 65 | shoulder (on MGU shaft) | 4 |
| 66 | second adapter drive surface | 6 |
| 67 | end of the shaft adapter | 14 |
| 82 | first pulley-associated drive surface | 6 |
| 84 | second pulley-associated drive surface | 6 |
| S1 | adapter drive surface spacing | 6 |
| S2 | pulley drive surface spacing | 6 |
| P | axial offset distance of isolation spring arrangement | 4 |
| Q | radial offset distance at least one isolation spring and the endless drive member engagement surface | 4 |
| 102 | first and second bushings | 2 |
| 104 | spring shell | 2 |
| 104a, 104b | shell halves | 5 |
| 105 | rivets | 5 |
| 106 | chamber | 5 |
| 108 | cover member | 5 |
| 110 | damping structure driver | 7 |
| 112a | first spreader member | 7 |
| 112b | second spreader member | 7 |
| 114a | first force transfer member | 7 |
| 114b | second force transfer member | 7 |
| 116a | first friction member | 7 |
| 116b | second friction member | 7 |

-continued

TABLE OF ELEMENTS:

| Reference # | Item | FIG. # |
|---|---|---|
| 117a | thrust washer | 2 |
| 117b | thrust washer | 2 |
| 118 | damping structure biasing arrangement | 7 |
| 120 | first spreader member engagement surface | 7 |
| 122 | second spreader member engagement surface | 7 |
| 124, 126 | force transfer member engagement surfaces | 7 |
| DS | selected spacing between the spreader members 112a and 112b relative to the force transfer members 114a and 114b | 7 |
| 132 | dust cover | 2 |
| 152, 154, 156, 158 | points on torque transfer curve | 150 |
| 160 | alternative damping structure | 12 |
| 200 | isolator (second example) | 13 |
| 201 | shaft engagement member | 14 |
| 203 | isolator engagement member | 14 |
| 202 | first internal threaded section (of the shaft adapter 214) | 13 |
| 204 | external threaded section (of the shaft 53a) | 13 |
| 206 | plug assembly | 13 |
| 207 | shaft adapter engagement teeth | 14 |
| 208 | central aperture of the shaft adapter | 14 |
| 212 | rotary drive member | 13 |
| 213 | endless drive member engagement surface | 13 |
| 214 | shaft adapter | 13 |
| 215 | bushing | 14 |
| 216 | isolation spring arrangement | 13 |
| 219 | outer edge of first springs 217a | |
| 222 | sheave grooves | 15 |
| 223 | diameter of the balls (DOB) | 15 |
| 253a | shaft | 13 |
| 255 | end of the shaft | 13 |
| PP | axial offset distance of isolation spring arrangement | 15 |
| QQ | radial offset distance at least one isolation spring and the endless drive member engagement surface | 4 |
| 266 | thrust bushing | 14 |
| 268 | thrust washer | 14 |
| 270 | first seal | 14 |
| 272 | second seal | 14 |
| 273 | spring sleeve | 14 |
| 273a | first spring sleeve half | 14 |
| 273b | second spring sleeve half | 14 |
| 274 | torque transfer arrows | 16, 17 |
| 276 | spring shell | 13 |
| 276a | first shell half | 14 |
| 276b | second shell half | 14 |
| 278 | damping structure | 18 |
| 280 | damping member | 18 |
| 282 | damping member exterior surface | 18 |
| 284 | rotary drive member damping surface | 18 |
| 286 | damping structure biasing member | 18 |
| T | frictional torque | 19 |
| L | engagement load | 18 |
| R | reaction load | 18 |
| F | friction force | 19 |
| X | distance from shaft adapter axis AA to the friction force | 19 |
| 288 | exterior shaft adapter surface | 18 |

The invention claimed is:

1. An isolator for isolating a device driven by an engine via an endless drive member, comprising:
a shaft adapter that is connectable with a shaft of the device;
a rotary drive member that is engageable with the endless drive member;
a first isolation spring arrangement that is positioned to transfer torque between the shaft adapter and the rotary drive member; and
a position-based damping structure that is positioned to transfer torque via a frictional damping force between the rotary drive member and the shaft adapter at a selected amount of relative movement therebetween, wherein the selected amount of relative movement is selected to be less than a maximum permitted amount of flexure of the first isolation spring arrangement,
wherein the frictional damping force increases with increased movement beyond the selected amount of relative movement between the shaft adapter and the rotary drive member,
wherein the damping structure includes a spreader member, a force transfer member, a friction member, a thrust member, and a biasing arrangement that applies a normal force urging the friction member against the thrust member to generate the frictional damping force therebetween,
wherein the spreader member rotates with one of the rotary drive member and the shaft adapter,
wherein the force transfer member is positioned to transfer movement of the spreader member to progressively flex the biasing arrangement,
such that relative movement between the rotary drive member and the shaft adapter beyond the selected amount of relative movement, drives the spreader member to drive the force transfer member to progressively increase flexure of the biasing arrangement, which in turn progressively increases the normal force urging the friction member against the thrust member, thereby progressively increasing the frictional damping force.

2. An isolator as claimed in claim 1, wherein the device is an MGU.

3. An isolator as claimed in claim 1, wherein the first isolation spring arrangement includes a first arcuate helical compression spring.

4. An isolator as claimed in claim 3, wherein the first isolation spring arrangement includes a second arcuate helical compression spring nested within the first arcuate helical compression spring.

5. An isolator as claimed in claim 1, wherein the friction member is a first friction member and wherein the damping structure includes a second friction member,
wherein the force transfer member is a first force transfer member and wherein the damping structure includes a second force transfer member,
wherein the second force transfer member is positioned to transfer movement of the spreader member to progressively flex the biasing arrangement,
wherein the thrust member is a first thrust member and wherein the damping structure includes a second thrust member,
wherein the biasing arrangement applies a normal force urging the first friction member against the first thrust member and urging the second friction member against the second thrust member, so as to generate the frictional damping force,
such that relative movement between the rotary drive member and the shaft adapter beyond the selected amount of relative movement, drives the spreader member to drive the first and second force transfer members to progressively increase flexure of the biasing arrangement, which in turn progressively increases the normal force urging the first and second friction members against the first and second thrust members, respectively, thereby progressively increasing the frictional damping force.

6. An isolator as claimed in claim 5, wherein the spreader member is a first spreader member and the damping structure includes a second spreader member that is circumferentially opposite the first spreader member, wherein one of the first and second force transfer members is fixed axially and wherein the first spreader member is movable axially.

7. An isolator as claimed in claim 5, wherein one of the first and second force transfer members is fixed axially and wherein the first spreader member is movable axially.

8. An isolator as claimed in claim 5, wherein the first and second friction members are rings that extend circumferentially through 360 degrees.

9. An isolator as claimed in claim 5, wherein both the first and second force transfer members are movable axially and are biased towards each other.

10. An isolator for isolating a device driven by an engine via an endless drive member, comprising:

a shaft adapter that is connectable with a shaft of the device;

a rotary drive member that is engageable with the endless drive member;

a first isolation spring arrangement that is positioned to transfer torque between the shaft adapter and the rotary drive member; and a position-based damping structure that is positioned to transfer torque via a frictional damping force between the rotary drive member and the shaft adapter at a selected amount of relative movement therebetween, wherein the selected amount of relative movement is selected to be less than a maximum permitted amount of flexure of the first isolation spring arrangement, wherein the first isolation spring arrangement includes a first arcuate helical compression spring, wherein the first isolation spring arrangement includes a second arcuate helical compression spring nested within the first arcuate helical compression spring.

11. An isolator as claimed in claim 10, wherein the device is an MGU.

* * * * *